(12) United States Patent
Ham et al.

(10) Patent No.: US 10,462,554 B2
(45) Date of Patent: Oct. 29, 2019

(54) DISPLAY APPARATUS

(71) Applicant: LG Display Co., Ltd., Seoul (KR)

(72) Inventors: Jongsik Ham, Gwangmyeong-si (KR); JooHong Lee, Seoul (KR); TaeYoung Jung, Daegu (KR); GwangHeon Ha, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 51 days.

(21) Appl. No.: 15/914,876

(22) Filed: Mar. 7, 2018

(65) Prior Publication Data

US 2018/0317000 A1   Nov. 1, 2018

(30) Foreign Application Priority Data

Apr. 29, 2017 (KR) .................. 10-2017-0055806

(51) Int. Cl.
*H04R 1/28* (2006.01)
*F21V 8/00* (2006.01)
*H04R 9/06* (2006.01)
*H04R 9/02* (2006.01)

(52) U.S. Cl.
CPC .......... *H04R 1/2807* (2013.01); *G02B 6/005* (2013.01); *G02B 6/0033* (2013.01); *G02B 6/0043* (2013.01); *G02B 6/0055* (2013.01); *G02B 6/0065* (2013.01); *G02B 6/0078* (2013.01); *G02B 6/0083* (2013.01); *G02B 6/0088* (2013.01); *H04R 1/2869* (2013.01); *H04R 9/025* (2013.01); *H04R 9/06* (2013.01); *H04R 2499/15* (2013.01)

(58) Field of Classification Search
CPC .... H04R 1/2807; H04R 1/2869; H04R 9/025; H04R 9/06; H04R 2499/15; H04R 7/04; H04R 7/045; H04R 7/06; G02B 6/0033; G02B 6/0043; G02B 6/005; G02B 6/0055; G02B 6/0065; G02B 6/0078; G02B 6/0083; G02B 6/0088
See application file for complete search history.

(56) References Cited

U.S. PATENT DOCUMENTS

| 5,796,854 | A | * | 8/1998 | Markow | ............... G06F 1/1616 |
| | | | | | 381/385 |
| 7,565,949 | B2 | | 7/2009 | Tojo | |
| 8,934,228 | B2 | * | 1/2015 | Franklin | ............... G06F 1/1652 |
| | | | | | 361/679.26 |
| 2002/0064290 | A1 | * | 5/2002 | Reynaga | ................ H04R 1/028 |
| | | | | | 381/152 |
| 2006/0227981 | A1 | | 10/2006 | Miyata | |

(Continued)

FOREIGN PATENT DOCUMENTS

| KR | 10-0690489 B1 | 3/2007 |
| KR | 10-0972901 B1 | 7/2010 |

(Continued)

*Primary Examiner* — Jason R Kurr
(74) *Attorney, Agent, or Firm* — Fenwick & West LLP

(57) ABSTRACT

Disclosed is a display apparatus capable of improving a sound quality through an accurate sound transmission, wherein the display apparatus may include a backlight module connected with a rear surface of a display panel, a rear structure for surrounding the backlight module, and a vibration generating device for vibrating the display panel through the backlight module, wherein the vibration generating device is fixed to the rear structure.

24 Claims, 13 Drawing Sheets

(56) References Cited

U.S. PATENT DOCUMENTS

| | | | |
|---|---|---|---|
| 2007/0202917 A1* | 8/2007 | Phelps | H04R 7/045 455/556.1 |
| 2014/0160040 A1* | 6/2014 | Kang | H04R 17/005 345/173 |
| 2014/0204310 A1 | 7/2014 | Lee et al. | |
| 2015/0341714 A1 | 11/2015 | Ahn et al. | |
| 2017/0127166 A1* | 5/2017 | Noma | H04R 7/16 |
| 2018/0070180 A1* | 3/2018 | Melakari | H04R 7/045 |
| 2018/0249251 A1* | 8/2018 | Kirisken | H04R 7/04 |

FOREIGN PATENT DOCUMENTS

| | | |
|---|---|---|
| KR | 10-1433571 B1 | 8/2014 |
| KR | 10-2015-0133918 | 12/2015 |

\* cited by examiner

DISPLAY APPARATUS

CROSS REFERENCE TO RELATED APPLICATIONS

This application claims the benefit of Republic of Korea Patent Application No. 10-2017-0055806 filed on Apr. 29, 2017, which is hereby incorporated by reference in its entirety.

BACKGROUND

Field of Technology

Embodiments of the present disclosure relate to a display apparatus.

Discussion of the Related Art

Generally, a display apparatus is widely used as a screen for displaying an image in various electronic products or home appliances such as television, monitor, notebook computer, smart phone, tablet computer, electric pad, wearable device, watch phone, mobile information device, navigation, or mobile control display device.

Generally, the display apparatus may include a display panel for displaying an image, and a sound device for outputting sound related with the displayed image.

However, in case of the general display apparatus, a sound which is output from the sound device advances to a rear or lower side of the display panel, whereby a sound quality may be deteriorated due to an interference with a sound reflected on a wall or ground. Thus, it causes a difficulty in maintaining accuracy of sound transmission, whereby it lowers a user's sense of immersion.

SUMMARY

Accordingly, embodiments of the present disclosure are directed to a display apparatus that substantially obviates one or more problems due to limitations and disadvantages of the related art, and an electronic device comprising the same.

An aspect of embodiments of the present disclosure is directed to provide a display apparatus enabling an accurate sound transmission.

Another aspect of embodiments of the present disclosure is directed to provide a display apparatus capable of enhancing a user's sense of immersion by improving sound quality.

Additional advantages and features of embodiments of the disclosure will be set forth in part in the description which follows and in part will become apparent to those having ordinary skill in the art upon examination of the following or may be learned from practice of embodiments of the disclosure. The objectives and other advantages of embodiments of the disclosure may be realized and attained by the structure particularly pointed out in the written description and claims hereof as well as the appended drawings.

To achieve these and other advantages and in accordance with the purpose of embodiments of the disclosure, as embodied and broadly described herein, there is provided a display apparatus that may include a backlight module connected with a rear surface of a display panel, a rear structure for surrounding the backlight module, and a vibration generating device for vibrating the display panel through the backlight module, wherein the vibration generating device is fixed to the rear structure.

It is to be understood that both the foregoing general description and the following detailed description of embodiments of the present disclosure are exemplary and explanatory and are intended to provide further explanation of the disclosure as claimed.

BRIEF DESCRIPTION OF THE DRAWINGS

The accompanying drawings, which are included to provide a further understanding of embodiments of the disclosure and are incorporated in and constitute a part of this application, illustrate embodiment(s) of the disclosure and together with the description serve to explain the principle of embodiments of the disclosure. In the drawings.

DETAILED DESCRIPTION

Figure 1:
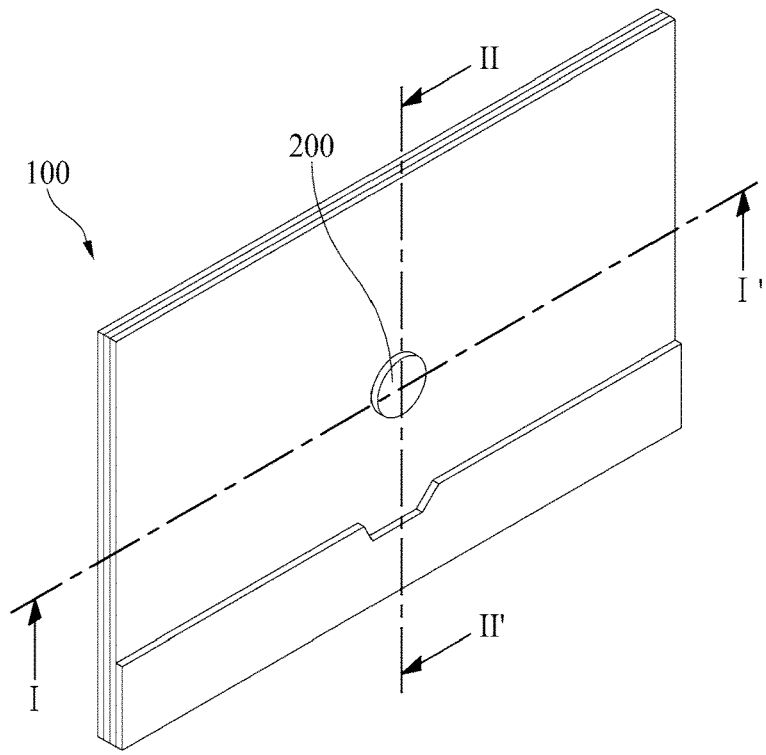
FIG. 1 is a rear view illustrating a display apparatus according to one embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts. Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error region although there is no explicit description.

In describing a position relationship, for example, when the positional order is described as 'on~', 'above~', 'below~', and 'next~', a case which is not contact may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Also, it should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a display apparatus according to the embodiment of the present disclosure will be described in detail with reference to the accompanying drawings.

Figure 2:
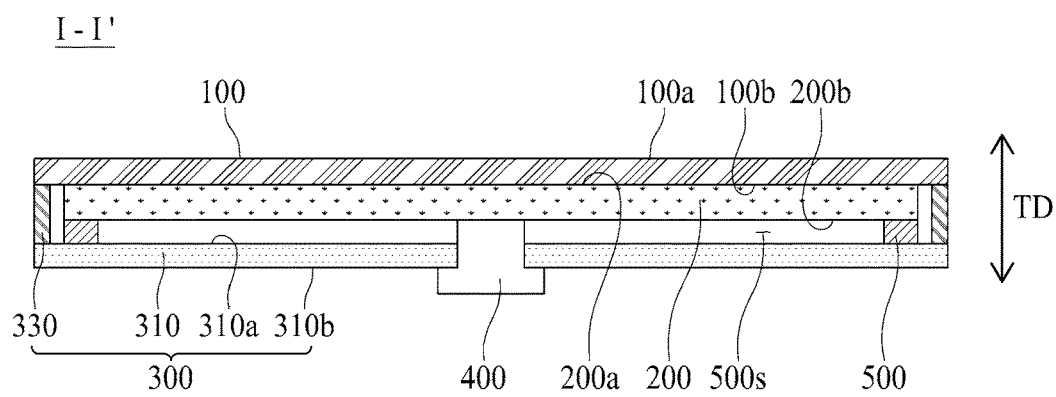
FIG. 2 is a cross sectional view illustrating the display apparatus according to one embodiment of the present disclosure.
Figure 3:
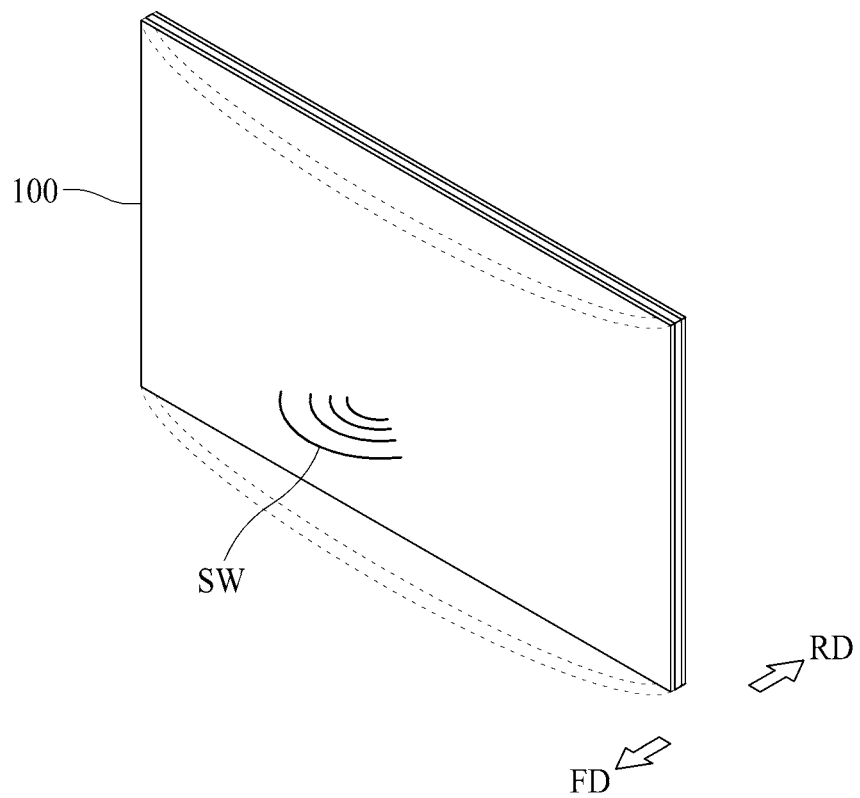
FIG. 3 illustrates a sound output in the display apparatus according to one embodiment of the present disclosure.

FIG. 1 is a rear view illustrating a display apparatus according to one embodiment of the present disclosure. FIG. 2 is a cross sectional view illustrating the display apparatus according to one embodiment of the present disclosure. FIG. 3 illustrates a sound output in the display apparatus according to one embodiment of the present disclosure.

Referring to FIGS. 1 to 3, the display apparatus according to one embodiment of the present disclosure may include a display panel 100, a backlight module 200, a rear structure 300, and a vibration generating device 400.

The display panel 100 is provided to display an image, wherein the display panel 100 includes a front surface 100a on which an image is displayed, and a rear surface 100b irradiated with light emitted from the backlight module 200. The display panel 100 according to one embodiment of the present disclosure corresponds to a liquid crystal display panel. In case of the liquid crystal display panel, an image is displayed by the use of light emitted from the backlight module 200.

The backlight module 200 is combined with the rear surface 100b of the display panel 100 with respect to a thickness direction (TD) of the display panel 100, whereby the rear surface 100b of the display panel 100 is irradiated with light emitted from the backlight module 200. That is, a front surface 200a of the backlight module 200 is connected with the rear surface 100b of the display panel 100, and a rear surface 200b of the backlight module 200 faces a front surface 310a of the rear structure 300. The backlight module 200 is combined with and formed as one body with the rear surface 100b of the display panel 100 by an attaching process.

In the display apparatus, the backlight module 200 according to one embodiment of the present disclosure may have an edge type backlight structure using a light-guiding member.

The backlight module 200 according to another embodiment of the present disclosure may include a white color illumination panel having a self-light emitting device layer which does not require an additional light source.

The rear structure 300 covers the backlight module 200. That is, the rear structure 300 covers the rear surface 200b of the backlight module 200, and also supports the vibration generating device 400.

The rear structure 300 according to one embodiment of the present disclosure may include a rear cover 310 for covering the rear surface 200b of the backlight module 200, and a lateral cover member 330 for covering a lateral surface of the backlight module 200.

The rear cover 310, which covers the entire rear surface 200b of the backlight module 200, may be formed in a plate shape of glass, metal, or plastic material. In this case, an edge or sharp corner of the rear cover 310 may be formed in a sloped or curved shape by a chamfering process or corner rounding process. For example, the rear cover 310 of the glass material may include any one of sapphire glass and gorilla glass, or a deposition-glass structure of sapphire glass and gorilla glass. In one example, the rear cover 310 of the metal material may be formed of any one among aluminum (Al), aluminum alloy, magnesium alloy, and alloy of iron (Fe) and nickel (Ni). In another example, the rear cover 310 may be formed in a deposition structure of a metal plate and a glass plate having a relatively-small thickness and facing the rear of the backlight module 200. In this case, the rear surface of the display apparatus may be used as a mirror plane by the metal plate.

The rear cover 310 may include a perforation (hole) 310h, wherein some of the vibration generation device 400 is inserted into the perforation 310h of the rear cover 310. The perforation 310h may have a circular or polygonal shape in a preset area of the rear cover 310 at the thickness direction (TD) of the rear cover 310.

The lateral cover member 330 covers the lateral surface of the backlight module 200, to thereby prevent a light leakage in a lateral surface of the display apparatus. That is, the lateral cover member 330 is interposed between front edges of the rear structure 300 and the remaining rear edges of the display panel 100 except one rear edge of the display panel 100 so that it is possible to seal a space between the display panel 100 and the rear structure 300, and to prevent light which is emitted from the backlight module 200 to the display panel 100 from being leaking in the lateral surface of the display apparatus. According to one embodiment of the present disclosure, the lateral cover member 330 may be a foam pad, foam tape, or adhesive resin. For example, the rear cover member 330 may include an acryl-based material or urethane-based material. In order to minimize a vibration transfer from the display panel 100 to the rear cover 310, the rear cover member 330 includes the urethane-based material which is relatively flexible in comparison to the acryl-based material, preferably. The rear cover member 330 seals the space between the rear structure 300 and the display panel 100 exposed to the exterior of the display apparatus, to thereby realize a good design of the display apparatus.

Selectively, it is possible to omit the lateral cover member 330 in accordance with a combination structure of the display panel 100, the backlight module 200, and the rear cover 310.

The vibration generating device 400 is fixed to the rear structure 300, and the vibration generating device 400 vibrates the display panel 100 through the backlight module 200, to thereby generate a sound which is output to a front direction (FD) of the display panel 100. That is, the vibration generating device 400 uses the display panel 100, which is vibrated together with the vibration of the backlight module 200, as a vibrating plate, to thereby generate the sound (SW).

The vibration generating device 400 according to one embodiment of the present disclosure, which penetrates through the rear structure 300, is in contact with the rear surface 200b of the backlight module 200, to thereby directly vibrate the backlight module 200. Herein, an upper portion of the vibration generating device 400 is inserted into the perforation 310h prepared in the rear structure 300, and is then connected with the rear surface 200b of the backlight module 200, and a lower portion of the vibration generating device 400 is fixed to the rear surface 310b of the rear cover 310. Accordingly, under the condition that the rear cover 310 of the rear structure 300 is used as a supporter for the vibration generating device 400, the vibration generating device 400 is vibrated in accordance with a voice current corresponding a sound signal related with the displayed image, and the backlight module 200 is vibrated by the vibration of the vibration generating device 400, whereby the display panel 100 is vibrated together with the vibration of the backlight module 200, to thereby output the sound (SW) to the front direction (FD).

The vibration generating device 400 according to one embodiment of the present disclosure is a speaker, wherein the vibration generating device 400 may be a sound actuator, a sound exciter, or a piezoelectric element, but not limited to these devices. The vibration generating device 400 may be any sound device capable of outputting a sound in accordance with an electrical signal.

The display apparatus according to one embodiment of the present disclosure may further include a first connection member 500.

The first connection member 500 having a predetermined thickness (or height) is interposed between the backlight module 200 and the rear structure 300, wherein the first connection member 500 may have a four-side closed or closed-loop type sealing structure. The first connection member 500 is prepared between the rear edge of the backlight module 200 and the front edge of the rear structure 300 so that the rear cover 310 of the rear structure 300 is connected with the rear surface 210b of the backlight module 200, to thereby prepare a gap space 500s between the rear surface 200b of the backlight module 200 and the front surface 310a of the rear cover 310. In this case, the gap space 500s may be used not only as an insertion space for some area of the vibration generating device 400 inserted into the perforation 310h of the rear structure 300, but also as a panel vibrating space for the vibration of the display panel 100 in accordance with the driving of the vibration generating device 400.

In the display apparatus according to the embodiment of the present disclosure, the display panel 100, which is vibrated through the vibration of the backlight module 200, is used as the vibrating plate so that the sound is output to the front side of the display panel 100 instead of the rear and lower sides of the display panel 100, thereby enhancing a user's sense of immersion by realizing accuracy of sound transmission and improving sound quality.

Figure 4:
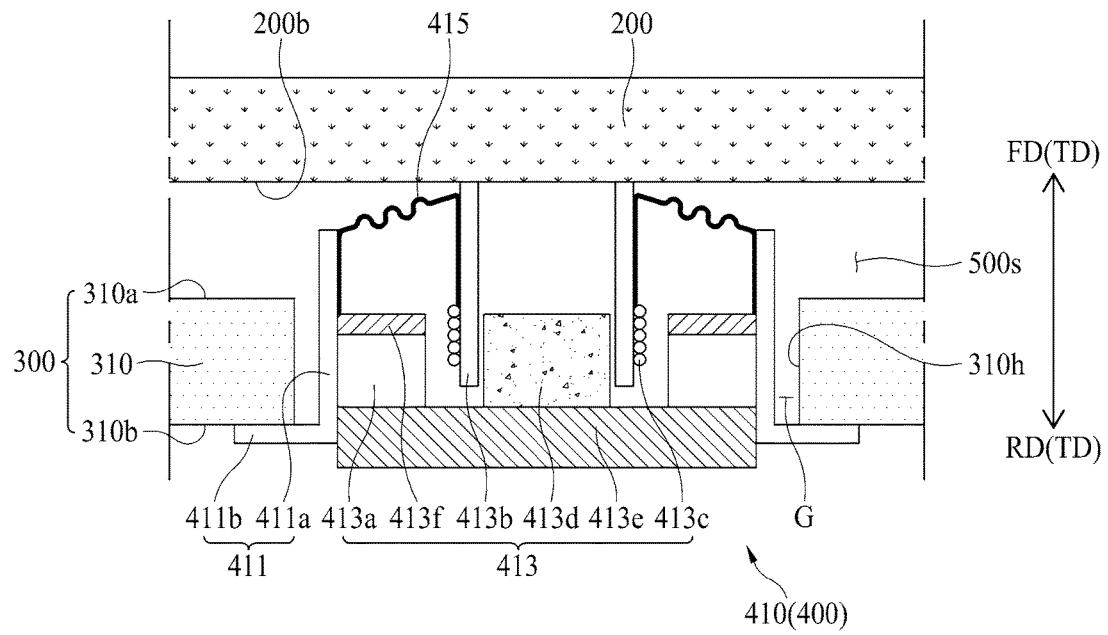
FIG. 4 is a cross sectional view illustrating a vibration generating device according to one embodiment of the present disclosure.

FIG. 4 is a cross sectional view illustrating the vibration generating device according to one embodiment of the present disclosure.

Referring to FIG. 4, the sound generating device 400 according to one embodiment of the present disclosure may include at least one sound generating module 410 for vibrating the display panel 100 through the backlight module 200, wherein the sound generating module 410 is fixed to the rear structure 300.

At least one sound generating module 410 may be provided to vibrate the backlight module 200 in accordance with a current applied based on Fleming's left hand rule, which may be referred to as a vibration generating module. The vibration generating device 400 according to one embodiment of the present disclosure has one sound generating module 410, wherein one sound generating module 410 may be disposed with respect to the center on the rear surface of the backlight module 200 or the center on a screen of the display panel 100.

The sound generating module 410 according to one embodiment of the present disclosure may be an actuator. The sound generating module 410 of the actuator may include a module frame 411, a magnetic circuit unit 413, and a damper 415.

When the module frame 411 is fixed to the rear structure 300, some area of the module frame 411 is inserted into the perforation 310h of the rear structure 300, and the module frame 411 supports the magnetic circuit unit 413. The module frame 411 according to one embodiment of the present disclosure may include a frame body 411a, and a support bracket 411b.

According as an upper portion of the frame body 411a is inserted into the perforation 310h prepared in the rear structure 300 with respect to the thickness direction (TD) of the display panel 100, the frame body 411a is disposed in the gap space 500s between the backlight module 200 and the rear structure 300. Between the frame body 411a and the perforation 310h of the rear structure 300, there is a predetermined gap (G) which serves as an air vent for a smooth air circulation in the gap space 500s for the vibration of the backlight module 200, and also serves as a passage for discharging noise components generated for the driving of the sound generating module 410 except a sound pressure in accordance with the vibration of the backlight module 200.

The support bracket 411b is provided at each of one side and the other side of the frame body 411a, and is fixed to the rear surface 310b of the rear structure 300.

The magnetic circuit unit 413 is provided in the module frame 411, to thereby vibrate the backlight module 200. The magnetic circuit unit 413 according to one embodiment of the present disclosure may include a magnet member 413a, an elevating member 413b, a coil 413c, and an elevating guider 413d. The magnetic circuit unit 413 with this structure may be referred to as a dynamic type or external type where the magnet member 413a is disposed at an external side of the coil 413c.

The magnet member 413a may be a permanent magnet with a ring shape. The magnet member 413a according to one embodiment of the present disclosure may use a sintered magnet of barium ferrite, and the magnet member 413a may be formed of an alloy-casting magnet of ferric oxide ($Fe2O_3$), barium carbonate ($BaCO_3$), strontium ferrite with improved magnetism, aluminum (Al), nickel (Ni), or cobalt (Co), but not limited to these materials.

The elevating member 413b is inserted into the magnet member 413a. That is, according as the elevating member 413b is inserted into the inside of the magnet member 413a having the ring shape, an outer surface of the elevating member 413b is surrounded by the magnet member 413a. The elevating member 413b according to one embodiment of the present disclosure may be formed in a cylinder structure of a material obtained by pulp or paper, aluminum, magnesium, alloy of aluminum and magnesium, synthetic resin such as polypropylene, or polyamide-based fiber.

The coil 413c is wound to surround a lower side of an outer circumferential surface of the elevating member 413b, and is supplied with a sound generating current from the external. The coil 413c is elevated together with the elevating member 413b. In this case, the coil 413c may be referred to as a voice coil. If a current is applied to the coil 413c, the entire elevating member 413b is guided and moved by the elevating guider 413d in accordance with Fleming's left hand rule based on an applied magnetic field around the coil 413c and an outer magnetic field around the magnet member 413a.

Meanwhile, as a front surface (front end) of the elevating member 413b is in contact with the rear surface 200b of the backlight module 200, the elevating member 413b vibrates the rear surface 200b of the backlight module 200 in accordance with whether or not the current is applied. Thus, sound waves are generated by the vibration of the display panel 100 which is linked with the vibration of the backlight module 200, and the generated sound waves are output to the front direction (FD) of the display panel 100.

Additionally, the elevating member 413b may include a buffer pad. The buffer pad is disposed on the front surface of the elevating member 413b, to thereby transfer the elevating movement (or vibration) of the elevating member 413b to the rear surface 200b of the backlight module 200. The buffer pad according to one embodiment of the present disclosure may be a ring-shaped plate member attached to the front surface of the elevating member 413b, or a circular-shaped plate member for covering the front surface of the elevating member 413b.

The elevating guider 413d is inserted into the elevating member 413b, to thereby guide the elevating movement of the elevating member 413b. That is, the elevating guider 413d is inserted into the inside of the elevating member 413b having the cylinder shape, whereby an outer circumferential surface of the elevating guider 413d is surrounded by the elevating member 413b. In this case, the elevating guider 413d may be referred to as a center pole or pole piece.

Additionally, the magnetic circuit unit 413 according to one embodiment of the present disclosure may further include a lower plate 413e, and an upper plate 413f.

The lower plate 413e is inserted into and fixed to a hollow prepared in the module frame 411, to thereby support a rear surface of the magnet member 413a, and a rear surface of the elevating guider 413d.

The upper plate 413f is connected with a front surface of the elevating guider 413d.

The lower plate 413e and the upper plate 413f according to one embodiment of the present disclosure may be formed of a magnetic material such as iron (Fe). The lower plate 413e and the upper plate 413f are not limited to these terms, and the lower plate 413e and the upper plate 413f may be referred to as yokes.

Selectively, the elevating guider 413d and the lower plate 413e may be formed as one body. That is, the elevating guider 413d vertically protruding from a front surface of the lower plate 413e has a shape capable of being inserted into the elevating member 413b, whereby the elevating guider 413s may be inserted into the elevating member 413b.

The damper 415 may be provided between the module frame 411 and the magnetic circuit unit 413. That is, the damper 415 may be provided between a body protrusion of the frame body 411a included in the module frame 411 and the elevating member 413b included in the magnetic circuit unit 413. The damper 415 may be referred to as a spider, suspension, or edge.

One end of the damper 415 according to one embodiment of the present disclosure may be connected with an inner sidewall of the body protrusion, and the other end of the damper 415 may be connected with an upper outer surface of the elevating member 413b. The damper 415 is formed in a wrinkled structure between its both ends so that it is possible to control the vibration of the elevating member 413b by contraction and relaxation movements in accordance with the elevating movement of the elevating member 413. That is, the damper 415 is connected between the elevating member 413b and the module frame 411 so that a vibration distance of the elevating member 413b is limited by a restoring force of the damper 415. For example, if the elevating member 413b is vibrated more than a predetermined distance or less than the predetermined distance, the elevating member 413b may be restored to its original position by the restoring force of the damper 415.

Selectively, the sound generating module 410 according to the embodiment of the present disclosure may include two or more sub sound generating modules which are parallel to each other, and are provided at a predetermined interval from each other. As described above, each of the two sub sound generating modules may include a module frame 411, a magnetic circuit unit 413, and a damper 415.

Figure 5:
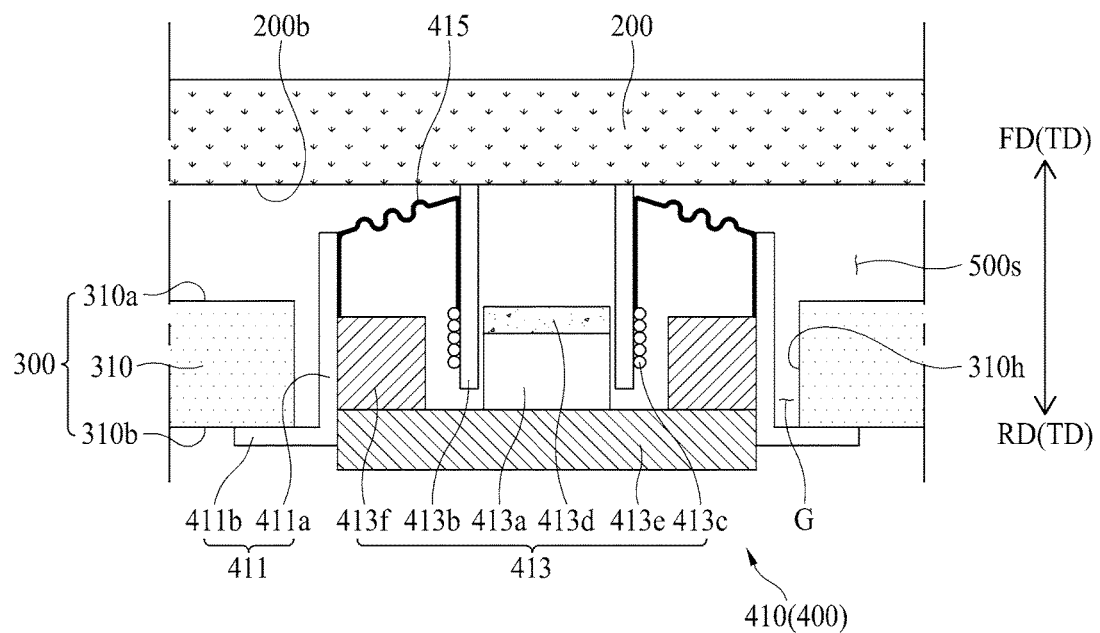
FIG. 5 is a cross sectional view illustrating a sound generating module according to another embodiment of the present disclosure.

FIG. 5 is a cross sectional view illustrating a sound generating module according to another embodiment of the present disclosure, which is obtained by changing a position of the magnet member of the sound generating module shown in FIG. 4. Hereinafter, a structure related with a position of a magnet member will be described in detail.

Referring to FIG. 5, the sound generating module 410 according to another embodiment of the present disclosure may be referred to as an internal type where a magnet member 413a of a magnetic circuit unit 413 is disposed at an internal side of a coil 413c.

The sound generating module 410 of the internal type may include a magnet member 413a prepared in the center of a lower plate 413e, an elevating guider 413d connected with a front surface of the magnet member 413a, an elevating member 413b for surrounding an outer surface of the magnet member 413a and an outer surface of the elevating guider 413d, a coil 413c wound to surround a lower side of an outer circumferential surface of the elevating member 413b, and an upper plate 413f protruding from a front edge of a lower plate 413e and surrounding the coil 413c. Selectively, the lower plate 413e and the upper plate 413f may be formed as one body with a shape of "U". The lower plate 413e and the upper plate 413f are not limited to these terms, and the lower plate 413e and the upper plate 413f may be referred to as yokes.

The sound generating module 410 of the internal type may have a small leakage flux, and a small entire size.

The display apparatus according to the embodiment of the present disclosure may include the external type or internal type sound generating module 410. Hereinafter, it is assumed that the display apparatus includes the internal type sound generating module 410.

The sound generating module 410 of the display apparatus according to the embodiment of the present disclosure is not limited to the structure of FIG. 4 or FIG. 5. The display apparatus according to the embodiment of the present disclosure may include any kind of sound generating module capable of generating sound by vibrating the display panel 100 in front and rear directions (FD, RD) according to a current application.

Figure 6A:
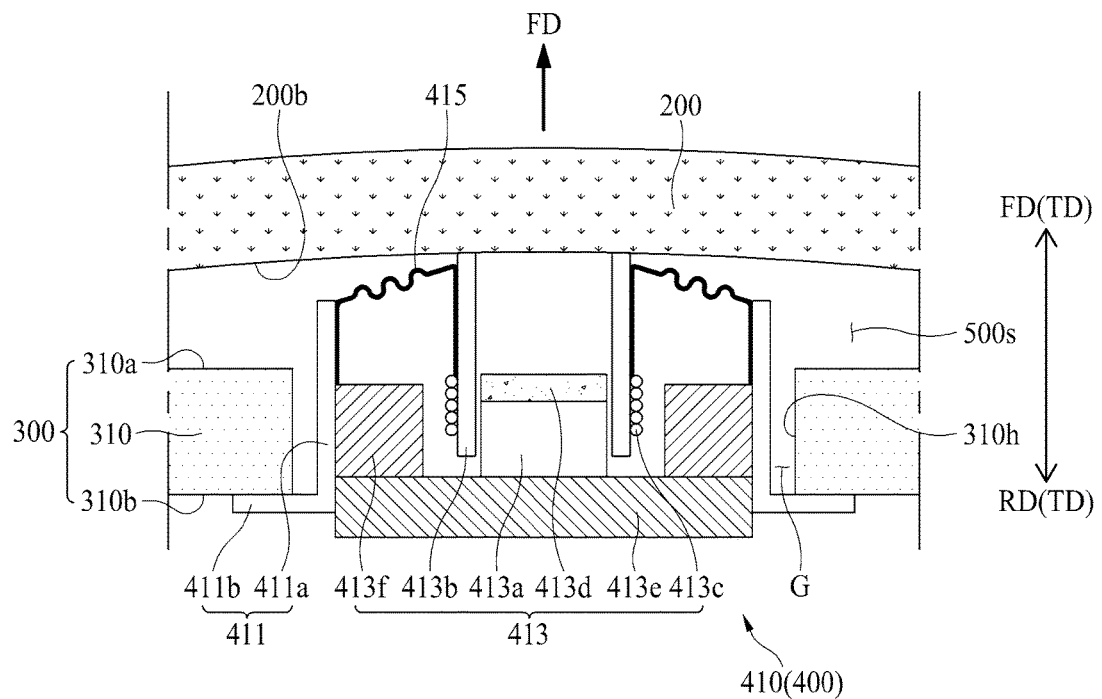
FIGS. 6A and 6B illustrate a sound generating method of the display apparatus according to the embodiment of the present disclosure.
Figure 6B:
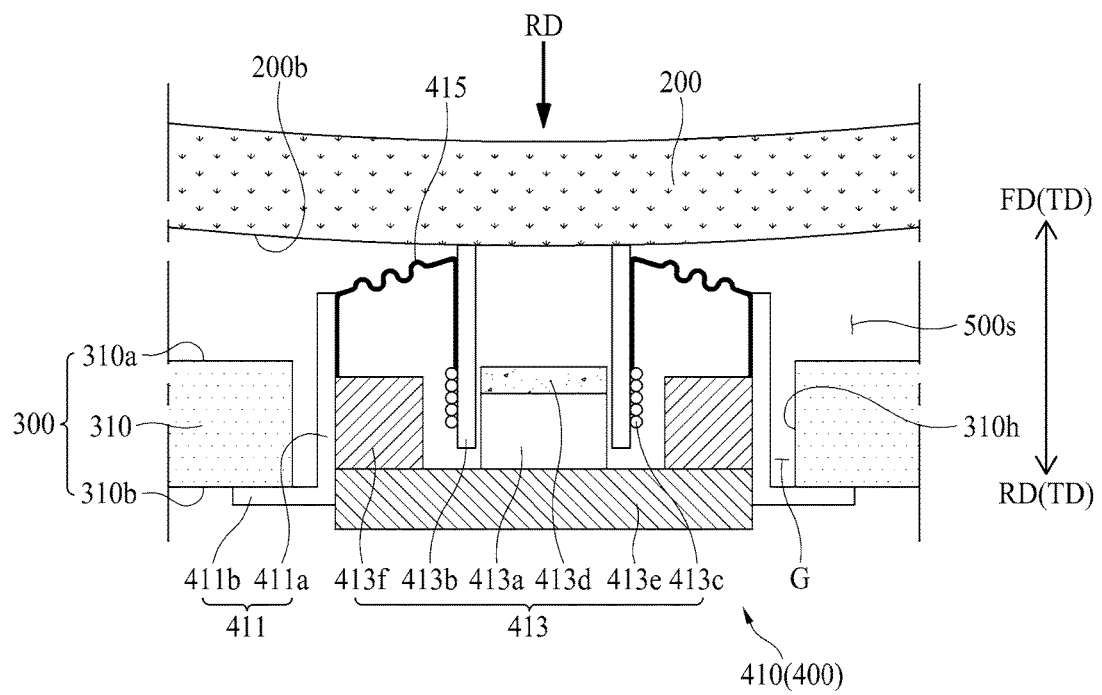

FIGS. 6A and 6B illustrate a sound generating method of the display apparatus according to the embodiment of the present disclosure.

In the sound generating module 410 of the vibration generating device 400 according to the embodiment of the present disclosure, the elevating guider 413d disposed on the lower plate 413e for supporting the magnet member 413a becomes the N pole, and the upper plate 413f connected with the front surface of the magnet member 413a becomes the S pole, to thereby form the outer magnetic field between the elevating guider 413d and the upper plate 413f Under this condition, if the sound generating current is applied to the coil 413c, the applied magnetic field is formed around the coil 413c. Thus, as shown in FIG. 6A, a force for moving the elevating member 413b toward the front direction (FD) of the display panel 100 is generated by the applied magnetic field and the outer magnetic field. According as the elevating member 413b moves toward the front direction (FD) of the display panel 100, the backlight module 200 being in contact with the elevating member 413b is moved toward the front direction (FD) of the backlight module 200, whereby the display panel 100 is vibrated, and the sound wave generated by the vibration of the display panel 100 is output to the front direction (FD) of the display panel 100.

In the display apparatus according to the embodiment of the present disclosure, the display panel 100 is vibrated in front and rear directions (FD, RD) according to the direction and level of the current applied to the coil 413c so that it is possible to output the sound to the front direction (FD) of the display panel 100.

Figure 7:
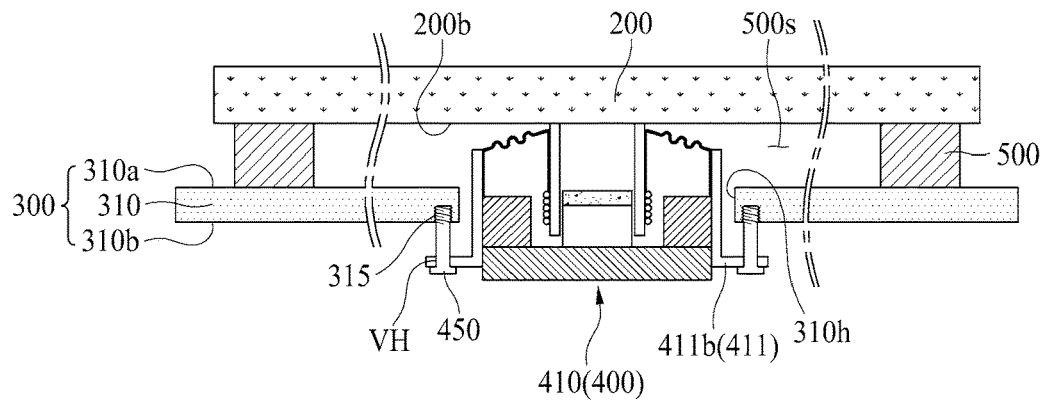
FIGS. 7 to 9 illustrate a connection structure between a rear structure and a sound generating module in the display apparatus according to the embodiment of the present disclosure.
Figure 8:
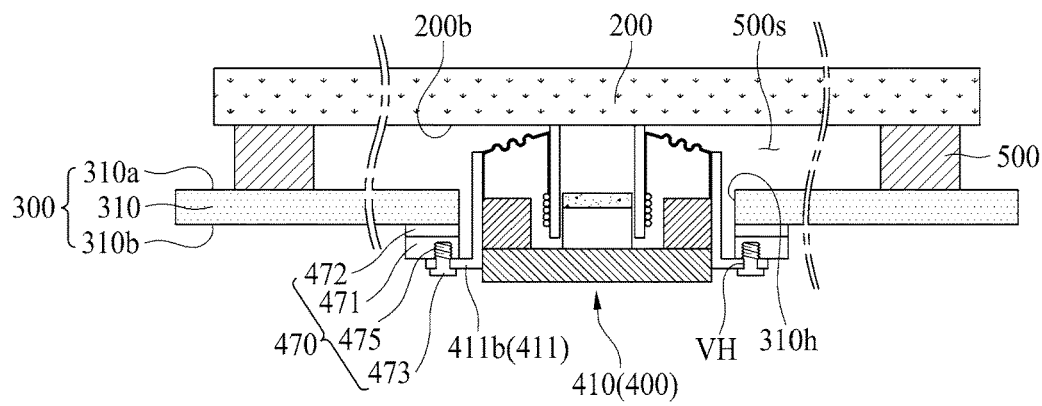
Figure 9:
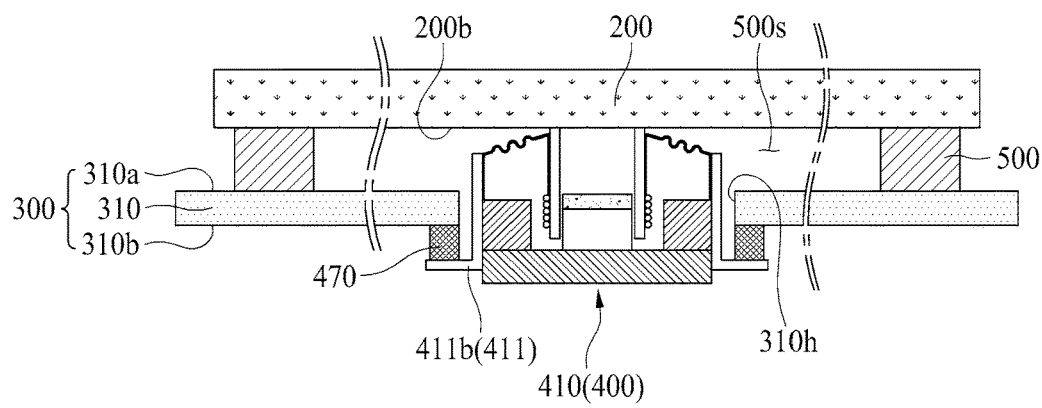

FIGS. 7 to 9 illustrate a connection structure between the rear structure and the sound generating module in the display apparatus according to the embodiment of the present disclosure.

Referring to FIG. 7, under the circumstances that some area of the sound generating module 410 of the vibration generating device 400 according to the embodiment of the present disclosure is inserted into the perforation 310h prepared in the rear cover 310 of the rear structure 300, the sound generating module 410 is fixed to the rear cover 310. For example, the remaining area of the sound generating module 410 except the supporting bracket 411b is inserted into the perforation 310h of the rear cover 310, and is also connected with the rear surface 200b of the backlight module 200, and the supporting bracket 411b of the sound generating module 410 is fixed to the rear surface 310b of the rear cover 310 corresponding to the circumference of the perforation 310h.

The display apparatus according to one embodiment of the present disclosure may further include a fastening member 450 to connect the sound generating module 410 and the rear cover 310 with each other.

The fastening member 450 fixes the supporting bracket 411b of the sound generating module 410 to the rear surface of the rear cover 310, to thereby fix the sound generating module 410 to the rear cover 310. The fastening member 450 according to one embodiment of the present disclosure may include a head, and a fastening portion with a screw thread connected with the head. For example, the fastening member 450 may include a bolt or screw.

The supporting bracket 411b of the sound generating module 410 includes a via hole (VH) through which the fastening portion of the fastening member 450 penetrates. The rear cover 310 includes a screw hole 315 which is overlapped with the via hole (VH), wherein the fastening portion of the fastening member 450 is fastened to the screw hole 315. Accordingly, the fastening member 450 is fastened to the screw hole 315 of the rear cover 310 through the via hole (VH) so that the supporting bracket 411b is fixed to the rear surface of the rear cover 310, to thereby fix the sound generating module 410 to the rear cover 310.

As described above, some area of the sound generating module 410 according to the embodiment of the present disclosure is inserted into the perforation 310h of the rear cover 310, and is connected with the rear surface of the backlight module 200, whereby it is possible to reduce a distance between the backlight module 200 and the rear cover 310, to thereby reduce a thickness of the display apparatus. That is, the sound generating module 410 may be disposed between the rear cover 310 and the rear surface of the backlight module 200. In this case, the distance between the backlight module 200 and the rear cover 310 is increased by the thickness (or height) of the sound generating module 410. Meanwhile, in case of the present disclosure, some area of the sound generating module 410 according to the embodiment of the present disclosure penetrates through the rear cover 310 so that it is possible to reduce the distance between the backlight module 200 and the rear cover 310.

As shown in FIG. 8, the display apparatus according to another embodiment of the present disclosure may further include a fixing member 470 so as to fix the vibration generating device 400 to the rear surface of the rear structure 300.

The fixing member 470 according to one embodiment of the present disclosure may include a fixing frame 471 fixed to the rear surface of the rear structure 300, and a fastening means 473 for fixing the vibration generating device 400 to the fixing frame 471.

The fixing frame 471 is disposed between the supporting bracket 411b of the sound generating module 410 and the rear surface 310b of the rear cover 310 for the rear structure 300, to thereby support the sound generating module 410. The fixing frame 471 is attached to the rear cover 310 of the rear structure 300 by the use of double-sided tape 472 or adhesive. For example, the fixing frame 471 may have a ring shape of rubber, plastic, or metal material. In this case, the fixing frame 471 may be referred to as a washer.

The fastening means 473 fixes the supporting bracket 411*b* of the sound generating module 410 to the fixing frame 471, to thereby fix the sound generating module 410 to the rear surface 310*b* of the rear cover 310. The fastening means 473 according to one embodiment of the present disclosure may include a head, and a fastening portion with a screw thread connected with the head. For example, the fastening means 473 may include a bolt or screw.

The supporting bracket 411*b* of the sound generating module 410 includes a via hole (VH) through which the fastening portion of the fastening means 473 penetrates. The fixing frame 471 includes a s screw hole 475 which is overlapped with the via hole (VH), wherein the fastening portion of the fastening means 473 is fastened to the screw hole 475. Accordingly, the fastening means 473 is fastened to the screw hole 475 of the fixing frame 471 through the via hole (VH) of the supporting bracket 411*b* so that the supporting bracket 411*b* is fixed to the rear surface of the fixing frame 471, to thereby fix the sound generating module 410 to the rear surface 310*b* of the rear cover 310 by the use of fixing frame 471.

As described above, some area of the sound generating module 410 according to the embodiment of the present disclosure is inserted into the perforation 310*h* of the rear cover 310, whereby it is possible to reduce a distance between the backlight module 200 and the rear cover 310, to thereby reduce a thickness of the display apparatus. Also, the vibration of the sound generating module 410 is absorbed in the fixing member 470 so that it is possible to minimize the vibration transferred from the sound generating module 410 to the rear cover 310.

Meanwhile, as shown in FIG. 9, the fixing member 470 according to another embodiment of the present disclosure may be double-sided tape or adhesive. That is, the sound generating module 410 may be fixed to the rear surface 310*b* of the rear cover 310 by the use of double-sided tape or adhesive. In this case, the fixing member 470 of the double-sided tape may include acryl-based material or urethane-based material. In order to minimize the vibration transfer from the sound generating module 410 to the rear cover 310, the fixing member 470 according to the embodiment of the present disclosure includes the urethane-based material which is relatively flexible in comparison to the acryl-based material, preferably. In this case, the fixing member 470 according to the embodiment of the present disclosure may include a foam pad including the urethane-based material, and an adhesive layer prepared on each of front and rear surfaces of the foam pad.

According to the embodiment of the present disclosure, the vibration of the sound generating module 410 is absorbed by an elastic force of the fixing member 470 of the double sided tape or adhesive so that it is possible to minimize the vibration transferred from the sound generating module 410 to the rear cover 310.

Figure 10:
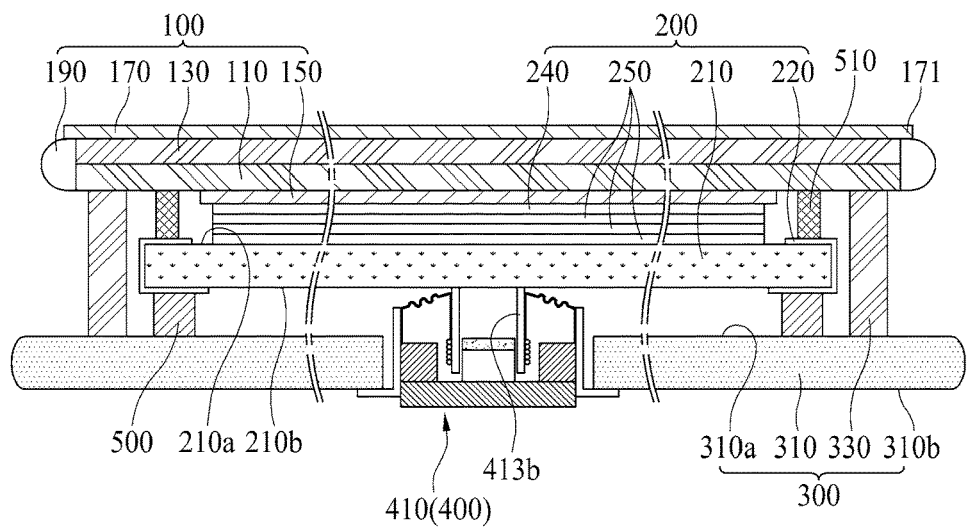
FIG. 10 is a cross sectional view along I-I' of FIG. 1 according to one embodiment of the present disclosure.
Figure 11:
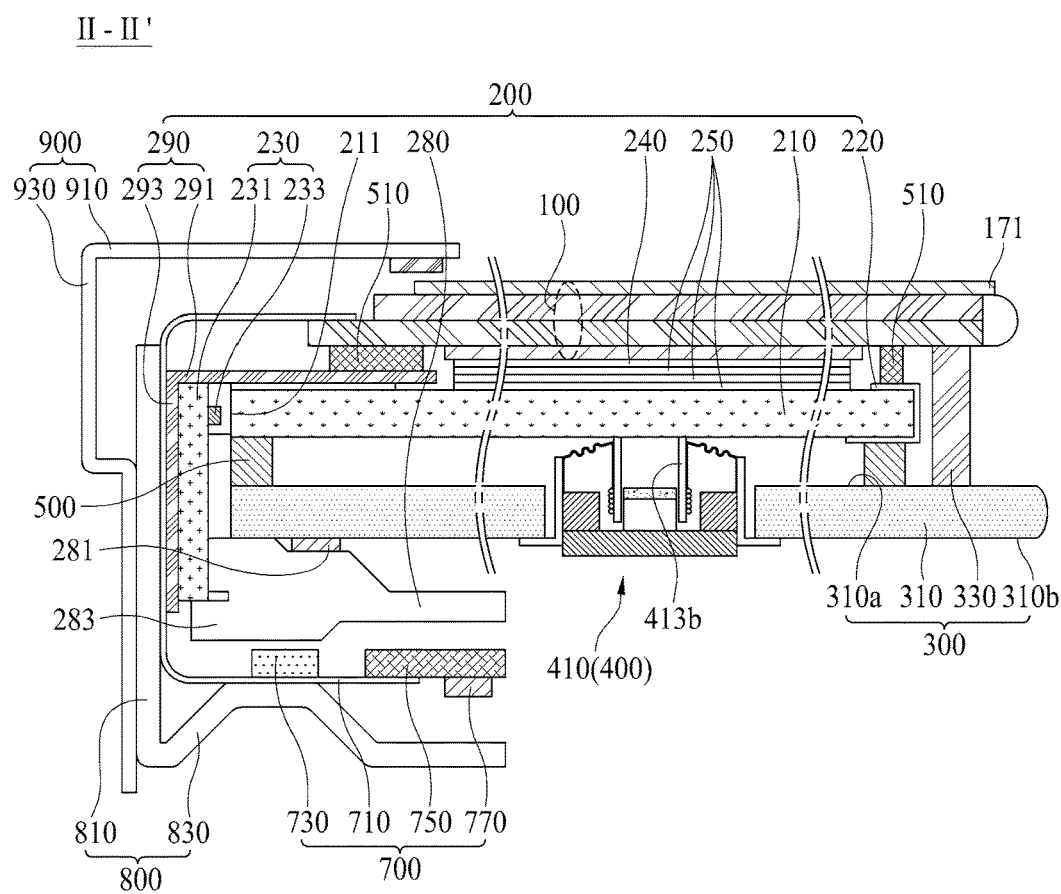
FIGS. 11 to 13 are cross sectional views along II-II' of FIG. 1 according to one embodiment of the present disclosure.

FIG. 10 is a cross sectional view along I-I' of FIG. 1, and FIG. 11 is a cross sectional view along II-II' of FIG. 1, which show a detailed structure of the display panel 100, and a detailed structure of the backlight module 200. Hereinafter, only the structure of the display panel 100 and the backlight module 200 will be described in detail, and a detailed description for the other elements except the display panel 100 and the backlight module 200 will be omitted.

In the display apparatus according to one embodiment of the present disclosure, referring to FIGS. 10 and 11, the display panel 100 according to one embodiment of the present disclosure may include confronting lower and upper substrates 110 and 130 bonded to each other with a liquid crystal layer interposed in-between.

The lower substrate 110 is a thin film transistor array substrate, which includes a pixel array having a plurality of pixels provided in respective pixel regions defined by a plurality of gate lines and a plurality of data lines. Each of the plurality of pixels includes a thin film transistor connected with the gate and data lines, a pixel electrode connected with the thin film transistor, and a common electrode provided adjacent to the pixel electrode and supplied with a common voltage.

The lower substrate 110 includes a pad portion prepared in a first edge, and a gate driving circuit prepared in a second edge.

The pad portion supplies externally-provided signals to the pixel array and the gate driving circuit. For example, the pad portion may include a plurality of data pads connected with the plurality of data lines through a plurality of data link lines, and a plurality of gate pads connected with the gate driving circuit through a gate control signal line.

The gate driving circuit may be provided (integrated) inside the first edge of the lower substrate 110 so as to be connected with the plurality of gate lines in a one-to-one correspondence relationship. In this case, the gate driving circuit may be a shift register including a transistor manufactured for the same process of forming the thin film transistor prepared in the pixel region.

The upper substrate 130 is a color filter array substrate, wherein the upper substrate 130 includes a black matrix for defining an opening region overlapped with each pixel region of the lower substrate 110, and a color filter formed in the opening region. The upper substrate 130 and the lower substrate 110 confronting each other are bonded to each other by the use of sealant, wherein the liquid crystal layer is interposed between the upper substrate 130 and the lower substrate 110.

The liquid crystal layer is interposed between the lower substrate 110 and the upper substrate 130, wherein the liquid crystal layer is formed of liquid crystal having liquid crystal molecules whose alignment is changed in accordance with an electric field formed by a data voltage applied to the pixel electrode prepared in each pixel and the common voltage applied to the common electrode.

The display panel 100 according to one embodiment of the present disclosure may further include a lower polarizing member 150, and an upper polarizing member 170.

The lower polarizing member 150 is attached to a rear surface of the lower substrate 110, whereby light emitted from the backlight module 200 to the lower substrate 110 is polarized in a first polarizing axis.

The upper polarizing member 170 is attached to a front surface of the upper substrate 130, whereby light emitted to the outside via the upper substrate 130 is polarized in a second polarizing axis which is different from the first polarizing axis.

Additionally, the display panel 100 according to one embodiment of the present disclosure may further include a lateral sealing member 190.

The lateral sealing member 190 is prepared to cover three outer surfaces and three corners except the first outer surface of the display panel 100 adjacent to the pad portion. The lateral sealing member 190 prevents a light leakage in a lateral surface of the display panel 100. To this end, the lateral sealing member 190 according to one embodiment of the present disclosure may be formed of silicon-based or UV-curing type sealant (or resin). In consideration of process tack time, preferably, the lateral sealing member 190 is formed of the UV-curing type sealant (or resin). Also, the lateral sealing member 190 may have a predetermined color (for example, blue color, red color, blue-green color, or black color), but not limited to these colors. Preferably, the lateral sealing member 190 may be formed of colored resin or light-blocking resin so as to prevent the lateral light leakage.

A predetermined area of an upper surface of the lateral sealing member 190 according to one embodiment of the present disclosure may be covered by the upper polarizing member 170. To this end, the upper polarizing member 170 includes an extending portion 171 which extends from an outer surface of the upper substrate 130 so as to cover some area of a front surface of the lateral sealing member 190, wherein the extending portion 171 is attached to some area of the front surface of the lateral sealing member 190. Accordingly, a contact surface between the lateral sealing member 190 and the upper substrate 130 is covered by the extending portion 171 of the upper polarizing member 170, and is not exposed to the front of the display apparatus in front of a user.

The liquid crystal layer is driven by the electric field formed in each of the pixels in accordance with the common voltage and the data voltage applied for each pixel, whereby an image is displayed by the use of light passing through the liquid crystal layer.

In the display apparatus according to one embodiment of the present disclosure, the backlight module 200 according to one embodiment of the present disclosure may include a light guiding member 210, a light source module 230, and an optical sheet portion 250.

The light guiding member 210 having a light-incidence surface 211 is disposed on the rear surface 100b of the display panel 100, and is connected with the elevating member 413b included in the sound generating module 410 of the vibration generating device 400. The light guiding member 210 changes a light-advancing direction of the light which is incident on the light-incidence surface 211 toward the display panel 110.

The light guiding member 210 according to one embodiment of the present disclosure may include a light-transmitting plastic or glass material. For example, the light guiding member 210 may be formed of sapphire glass or gorilla glass, but not limited to these materials. The light guiding member 210 may be formed of any glass enabling a light guiding function.

The light guiding member 210 according to one embodiment of the present disclosure may further include a plurality of optical patterns.

For example, if the light guiding member 210 is formed of the light-transmitting plastic material, the plurality of optical patterns may be prepared in an embossing or engraving shape on the rear surface 210b of the light guiding member 210.

According to another example, if the light guiding member 210 is formed of the glass material, the plurality of optical patterns are prepared inside the light guiding member 210. For example, the plurality of optical patterns may be prepared inside the light guiding member 210 adjacent to the rear surface 210b of the light guiding member 210 by a laser patterning process. Each of the plurality of optical patterns scatters or refracts the light which is incident on the light-incidence surface 211, to thereby improve an emission efficiency of the light emitted to a front surface 210a of the light guiding member 210.

Selectively, the remaining three outer surfaces except the light-incidence surface 211 of the light guiding member 210 may be covered by an edge light-leaking prevention member 220.

The edge light-leaking prevention member 220 according to one embodiment of the present disclosure may be a white-color tape, or a reflective tape or reflective coating layer including a light reflecting layer of a light reflecting material. The edge light-leakage preventing member reflects the leaking light which is incident through the three outer surfaces of the light guiding member 210 to the inside of the light guiding member 210, to thereby prevent the light leakage in the lateral surface of the light guiding member 210.

Additionally, the edge light-leaking preventing member 220 according to one embodiment of the present disclosure may have a cross section with a shape of '⊐' so as to cover front and rear edges of the light guiding member 210 being in contact with the three outer surfaces. In this case, the edge light-leaking prevention member 220 according to one embodiment of the present disclosure may additionally prevent a light leakage occurring in the front and rear edges of the light guiding member 210 overlapped with a non-display area of the display panel 100.

The light guiding member 210 vibrates in accordance with the elevating movement of the elevating member 413b for the sound generating module 410, to thereby vibrate the display panel 100.

The light-incidence surface 211 prepared in the light guiding member 210 is irradiated with light emitted from the light source module 230. The light source module 230 according to one embodiment of the present disclosure may include a plurality of light emitting diodes 233 mounted on a light source printed circuit board 231, wherein the light-incidence surface 211 of the light guiding member 210 is irradiated with light emitted from the plurality of light emitting diode devices 233.

The plurality of light emitting diode devices 233 are provided at fixed intervals, and are mounted on the light source printed circuit board 231. Each of the plurality of light emitting diode devices 233 is spaced from the light-incidence surface 211 of the light guiding member 210 by an optical gap, and is disposed to have a predetermined pitch (or interval) along a length direction of the light-incidence surface 211 prepared in the light guiding member 210. In this case, the optical gap and the pitch (or interval) in the plurality of light emitting diode devices 233 may be set within a range of preventing a hot spot phenomenon caused by bright and dark portions in a light-incidence area of the light guiding member 210 including the light-incidence surface 211. In this case, the light source printed circuit board 231 may be a flexible printed circuit film.

The optical sheet portion 250 is disposed on the front surface 210a of the light guiding member 210, and is connected with the rear surface 100b of the display panel 100. The optical sheet portion 250 improves the luminance properties of the light guided by the light guiding member 210, and transmits the vibration of the light guiding member 210 to the display panel 100.

The optical sheet portion 250 according to one embodiment of the present disclosure may be a complex optical sheet having a diffusion function of the incident light, and a collection function of the diffused light.

The complex optical sheet according to one embodiment of the present disclosure may be attached to the rear surface 100b of the display panel 100 by the use of first transparent adhesion member 240. For example, the complex optical sheet may be attached to the rear surface 100b of the display panel 100 by a lamination process using the first transparent adhesion member 240. Selectively, if the optical sheet portion 250 according to one embodiment of the present disclosure is formed of one complex optical sheet, a plurality of light-collection patterns including a prism or lenticular pattern may be additionally prepared on the front surface 210a or rear surface 210b of the light guiding member 210.

The first transparent adhesion member 240 according to one embodiment of the present disclosure may be attached to an entire front surface of the complex optical sheet so as to prevent an air gap between the front surface of the complex optical sheet and the rear surface 100b of the display panel 100. In this case, the vibration of the light guiding member 210 may be transferred to the display panel 100 through the complex optical sheet and the first transparent adhesion member 240. If there is the air gap between the complex optical sheet and the display panel 100, the vibration transferred to the display panel 100 may be reduced by the air gap. Accordingly, the first transparent adhesion member 240 is entirely interposed between the complex optical sheet and the display panel 100 so as to transfer the vibration of the light guiding member 210 to the display panel 100 without any reduction, preferably.

The first transparent adhesion member 240 according to one embodiment of the present disclosure may be optical adhesive or optical adhesion film, but not limited to these types. For example, the first transparent adhesion member 240 may be optical clear adhesive (OCA) or optical clear resin (OCR).

Selectively, the rear surface of the complex optical sheet according to one embodiment of the present disclosure may be in contact with the front surface of the light guiding member 210 while being not attached to the front surface of the light guiding member 210. That is, the rear surface of the complex optical sheet may be placed (or supported) onto the front surface 210a of the light guiding member 210 so that the rear surface of the complex optical sheet may be in surface-contact with the entire front surface 210a of the light guiding member 210 without an additional adhesion member.

The optical sheet portion 250 according to another embodiment of the present disclosure may include first to third optical sheets.

The first optical sheet corresponds to a first diffusion sheet having a light scattering layer or light-scattering particles. The first optical sheet, which is disposed on the front surface 210a of the light guiding member 210, firstly scatters or diffuses the incident light guided by the light guiding member 210, and then emits the firstly-scattered or firstly-diffused light.

The second optical sheet corresponds to a second diffusion sheet having a light scattering layer or light-scattering particles. The second optical sheet, which is attached to a front surface of the first optical sheet, secondly scatters or diffuses the incident light provided from the first optical sheet.

The third optical sheet corresponds to a prism sheet including a plurality of prism patterns. The third optical sheet is attached to a front surface of the second optical sheet, and the third optical sheet collects the incident light provided from the second optical sheet through the use of prism patterns, and emits the collected light.

Selectively, the second optical sheet may be changed to a lower prism sheet. The lower prism sheet according to one embodiment of the present disclosure may include a plurality of lower prism patterns which extend along a horizontal axis direction, and are in contact with one another along a vertical axis direction. In this case, the third optical sheet may be an upper prism sheet. The upper prism sheet according to one embodiment of the present disclosure may include a plurality of upper prism patterns which extends along the vertical axis direction, and are in contact with one another along the horizontal axis direction. Accordingly, the lower prism pattern may be arranged to be perpendicular to the upper prism pattern.

For example, the third optical sheet may be attached to the rear surface 100b of the display panel 100 by the use of first transparent adhesion member 240. The second optical sheet may be attached to an entire rear surface of the third optical sheet by the use of first sheet adhesion member. The first optical sheet may be attached to an entire rear surface of the second optical sheet by the use of second sheet adhesion member. Each of the first and second sheet adhesion members according to one embodiment of the present disclosure may be optical adhesive or optical adhesion film, but not limited to these types. For example, each of the first and second sheet adhesion members may be optical clear adhesive (OCA) or optical clear resin (OCR).

The backlight module 200 according to one embodiment of the present disclosure may further include a light source housing 280, and a front light-leaking prevention member 290.

The light source housing 280 supports one rear edge of the rear structure 300. That is, the light source housing 280 supports one rear edge of the rear cover 310 adjacent to the light source module 230. Also, the light source housing 280 is in contact with the light source module 230, that is, an inner surface of the light source printed circuit board 231 so that it is possible to maintain a uniform interval between the light-incidence surface 211 of the light guiding member 210 and the light source module 230. The light source housing 280 may be connected with one rear edge of the rear cover 310 by the use of adhesion member 281 such as double-sided tape or adhesive.

Selectively, the light source housing 280 may further include a light source supporting portion 283 for additionally supporting the light source module 230. The light source supporting portion 283 protrudes from a lower side of an outer surface of the light source housing 280 confronting the light source module 230, to thereby support a rear surface of the light source module 230.

The front light-leaking prevention member 290 covers a light-incidence portion of the backlight module 200. That is, the front light-leaking prevention member 290 covers one front edge of the light guiding member 210 adjacent to the light-incidence surface 211 of the light guiding member 210, a front surface of the light source module 230, and the optical gap prepared between the light source module 230 and the light-incidence surface 211 of the light guiding member 210. The front light-leaking prevention member 290 according to one embodiment of the present disclosure may be formed in a plate shape, and may be attached to one front edge of the light guiding member 210 and the front surface of the light source module 230 by the use of adhesive layer. For example, the front light-leaking prevention member 290 may be single-sided tape having a matt black color or a reflective layer. In this case, the reflective layer may include a silver reflective coating layer or a white-color coating layer. The front light-leaking prevention member 290 prevents a light leakage in a front surface of the light-incidence portion of the backlight module 200, and furthermore, prevents a light leakage by the vibration of the light guiding member 210.

The display apparatus according to one embodiment of the present disclosure may further include a second connection member 510.

The second connection member 510 is interposed between the front edge of the light guiding member 210 and the rear edge of the display panel 100, wherein the second connection member 510 may have a four-side closed or closed-loop type sealing structure. As the second connection member 510 is connected with the light guiding member 210 and the display panel 100, the light guiding member 210 is connected with the rear surface of the display panel 100 under the condition that the optical sheet portion 250 is interposed between the light guiding member 210 and the rear surface of the display panel 100. The second connection member 510 covers all lateral surfaces of the optical sheet portion 250 so that it is possible to prevent the light from leaking to the outside of the display apparatus through each lateral surface of the optical sheet portion 250, and furthermore, it is possible to transfer the vibration of the light guiding member 210 to the display panel 100.

Meanwhile, a front surface of the second connection member 510 may be connected with the lower substrate of the display panel 100 or the lower polarizing member 150. Preferably, the front surface of the second connection member 510 is connected with the rear edge of the lower substrate 110 so as to prevent the light leakage in the lateral surface of the lower polarizing member 150 or to improve the adhesion with the display panel 100.

For example, the second connection member 510 may include an acryl-based material or urethane-based material. Preferably, in order to transfer the vibration of the light guiding member 210 to the display panel 100, the second connection member 510 includes the acryl-based material which has relatively-good adhesion and relatively-high hardness. In this case, the second connection member 510 may include a foam pad including the acryl-based material, and an adhesive layer prepared in each of front and rear surfaces of the foam pad.

Selectively, according to another example, the urethane-based material has relatively-high light-leaking prevention efficiency in comparison to that of the acryl-based material. In consideration of the light-leaking prevention efficiency, the second connection member 510 may include the urethane-based material.

Preferably, a thickness (or height) of the second connection member 510 is preset within a range enabling a surface contact between the rear surface of the optical sheet portion 250 and the entire front surface 210a of the light guiding member 210. If the rear surface of the optical sheet portion 250 is not in surface-contact with the front surface 210a of the light guiding member 210 due to the thickness of the second connection member 510, an irregular air gap is generated between the optical sheet portion 250 and the light guiding member 210. This irregular air gap causes a reduction of the vibration transferred from the light guiding member 210 to the display panel 100, to thereby deteriorate sound quality by the vibration of the display panel 100. Accordingly, if the second connection member 510 is connected with the lower substrate 110 of the display panel 100, the thickness of the second connection member 510 is preset within the range enabling the surface contact between the rear surface of the optical sheet portion 250 and the entire front surface 210a of the light guiding member 210 on the basis of a thickness of the lower polarizing member 150 and a thickness of the optical sheet portion 250.

Meanwhile, the second connection member 510 of the backlight module 200, which is overlapped with one edge of the display panel 100, may be interposed between the front light-leaking prevention member 290 and one rear edge of the display panel 100. In this case, the front light-leaking prevention member 290 may be formed of thin film tape having the light-reflecting properties. The thickness of the second connection member 510 may be increased according as the thickness of the front light-leaking prevention member 290 becomes thinner. If the thickness of the second connection member 510 is increased, it is possible to enhance the light-leakage prevention efficiency in the lateral surface of the backlight module 200 by the second connection member 510.

The display apparatus according to one embodiment of the present disclosure may further include a display driving circuit 700, and a cover shield 800.

The display driving circuit 700 is connected with the pad portion prepared in the display panel 100, whereby an image corresponding to video data supplied from a display driving system is displayed on each pixel. The display driving circuit 700 according to one embodiment of the present disclosure may include a plurality of data flexible circuit films 710, a plurality of data driving integrated circuits 730, a display printed circuit board 750, and a timing controller 770.

Each of the plurality of data flexible circuit films 710 is attached to the pad portion prepared in the lower substrate 110 of the display panel 100 by a film attaching process. Each of the plurality of data flexible circuit films 710 is bent to surround each lateral surface of the display panel 100 and the backlight module 200, and is then connected with the display printed circuit board 750 at the rear surface of the light source housing 280.

Each of the plurality of data driving integrated circuits 730 is individually provided on each of the plurality of data flexible printed circuit films 710. The data driving integrated circuit 730 receives pixel data and a data control signal from the timing controller 770, converts the pixel data into an analog type data voltage for each pixel in accordance with the data control signal, and supplies the analog type data voltage to the corresponding data line.

The display printed circuit board 750 is connected with the plurality of data flexible circuit films 710. The display printed circuit board 750 supports the timing controller 770, and transmits signals and power among the elements of the display driving circuit 700.

The timing controller 770 is provided on the display printed circuit board 750, and the timing controller 770 receives video data and a timing synchronization signal from the display driving system through a user connector prepared in the display printed circuit board 750. The timing controller 770 generates pixel data by arranging the video data to be appropriate for a pixel arrangement structure in accordance with the timing synchronization signal, and provides the generated pixel data to the corresponding data driving integrated circuit 730. Also, the timing controller 770 generates a data control signal and a gate control signal based on the timing synchronization signal, controls a driving timing in each of the plurality of data driving integrated circuits 730 in accordance with the data control signal, and controls a driving timing of the gate driving circuit in accordance with the gate control signal.

The cover shield 800 covers the light-incidence portion of the backlight module 200, and its adjoining rear surface. That is, the cover shield 800 is provided to protect the light source module 230 and the display driving circuit 700 from an external shock. The cover shield 800 covers one lateral surface of the backlight module 200 provided with the light source module 230, and the display driving circuit 700 disposed at the rear surface of the rear structure 300. The cover shield 800 according to one embodiment of the present disclosure may include a lateral shield 810, and a rear shield 830.

The lateral shield 810 covers one lateral surface of the backlight module 200, that is, a lateral cover portion 293 of the front light-leaking prevention member 290, and the plurality of data flexible circuit films 710 disposed at one lateral surface of the backlight module 200.

The rear shield 830 is bent from one end of the lateral shield 810 to the rear surface of the rear cover 310, to thereby cover the display driving circuit 700 and the light source housing 280 disposed at the rear surface of the rear cover 310. Additionally, the rear shield 830 may include an extending shield which covers a main board provided with the display driving system and disposed at the rear surface of the rear cover 310. The extending shield may be provided to have a triangle shape in a rear design (or exterior) of the display apparatus, and also to cover the vibration generating device fixed to the rear cover 310 in accordance with the corresponding shape. Selectively, the extending shield may be manufactured in a shape separated from the cover shield 800, and may be connected with the rear surface of the rear cover 310 so as to cover the main board and the vibration generating device.

The display apparatus according to one embodiment of the present disclosure may further include a front part case 900.

The front part case 900 covers one edge of the display panel 100, and one lateral surface of the backlight module 200. That is, the front part case 900 covers the display driving circuit 700 and the pad portion of the display panel 100 exposed in front of the display apparatus, wherein the front part case 900 includes a front part 910, and a lateral part 930.

The front part 910 covers one edge of the display apparatus overlapped with the pad portion of the display panel 100. That is, the front part 910 covers the entire lateral shield 810 included in the cover shield 800, the front light-leaking preventing member 290, and the pad portion and one side of the non-display area in the display panel 100 exposed in front of the display apparatus.

The lateral part 930 is bent from an end of one side of the front part 910 to the lateral shield 810 of the cover shield 800, to thereby cover the lateral shield 810 of the cover shield 800.

Figure 12:
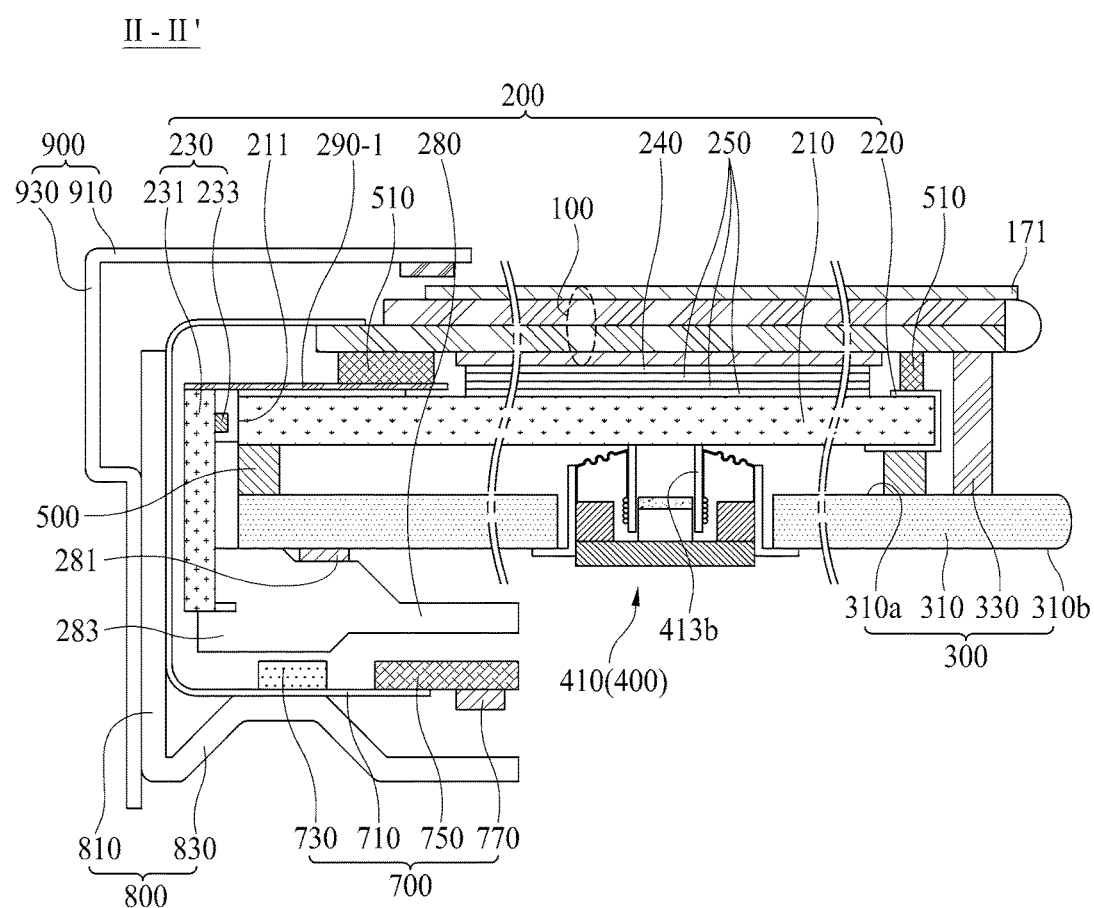

FIG. 12 is a cross sectional view along II-II' of FIG. 1, which is obtained by changing a structure of the front light-leaking prevention member of the backlight module. Hereinafter, only the structure of the front light-leaking prevention member will be described in detail, and a detailed description for the other elements except the front light-leaking prevention member will be omitted.

Referring to FIG. 12, the front light-leaking prevention member 290-1 of the backlight module 200 according to the embodiment of the present disclosure covers the light-incidence portion of the backlight module 200, and front and lateral surfaces of the light source module 230. That is, the front light-leaking prevention member 290-1 covers one front edge of the light guiding member 210 adjacent to the light-incidence surface 211 of the light guiding member 210, the optical gap prepared between the light-incidence surface 211 of the light guiding member 210 and the light source module 230, and the front and lateral surfaces of the light source module 230. Accordingly, the front light-leaking prevention member 290-1 prevents the light leakage in the front surface of the light-incidence portion of the backlight module 200, and furthermore, prevents the light leakage by the vibration of the light guiding member 210. The front light-leaking prevention member 290-1 according to one embodiment of the present disclosure may include a front cover 291, and a lateral cover 293.

The front cover 291 covers one front edge of the light guiding member 210, the front surface of the optical gap, and the front surface of the light source module 230. In this case, the front cover 291 may be attached to one front edge of the light guiding member 210 by the use of double-sided tape or adhesive.

The lateral cover 293 is vertically connected with an end of one side of the front cover 291, to thereby cover the lateral surface of the light source module 230. That is, the lateral cover 293 is bent from one end of one side of the front cover 291, whereby the front cover 291 and the lateral cover 293 may have a cross section with a shape of 'Γ'. Selectively, an inner surface of the lateral cover 293 may be connected with the outer surface of the light source module 230, that is, the light source printed circuit board 231 by the use of double-sided tape or adhesive, to thereby support the light source printed circuit board 231.

Meanwhile, the second connection member 510 of the backlight module 200, which is overlapped with one edge of the display panel 100, may be interposed between the front cover 291 of the front light-leaking prevention member 290-1 and one rear edge of the display panel 100.

Figure 13:
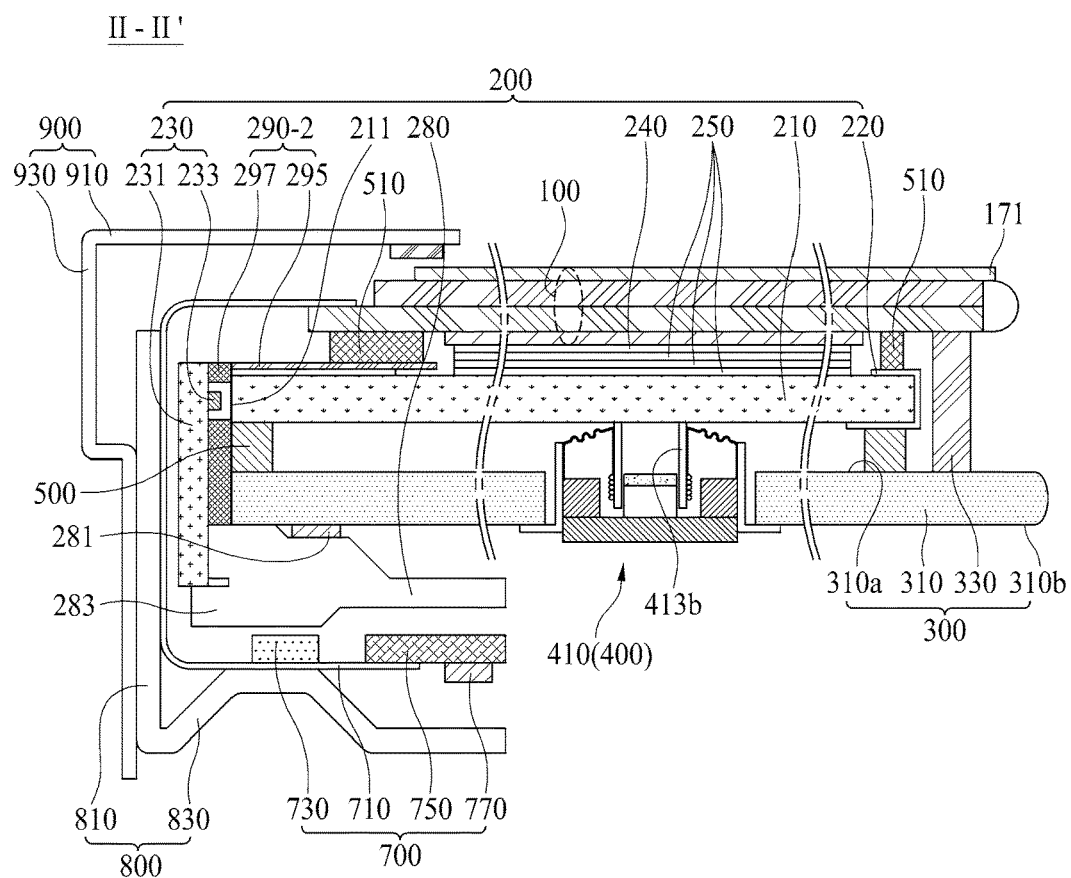

FIG. 13 is a cross sectional view along II-II' of FIG. 1, which is obtained by changing a structure of the front light-leaking prevention member of the backlight module. Hereinafter, only the structure of the front light-leaking prevention member will be described in detail, and a detailed description for the other elements except the front light-leaking prevention member will be omitted.

Referring to FIG. 13, the front light-leaking prevention member 290-2 of the backlight module 200 according to the embodiment of the present disclosure covers one front edge of the light guiding member 210 adjacent to the light-incidence surface 211 of the light guiding member 210, and also covers the space between the light-incidence surface 211 of the light guiding member 210 and the light source module 230. Accordingly, the front light-leaking prevention member 290-2 prevents the light leakage in the front surface of the light-incidence portion of the backlight module 200, and furthermore, prevents the light leakage by the vibration of the light guiding member 210. The front light-leaking prevention member 290-2 according to one embodiment of the present disclosure may include a light-shielding layer 295, and a light-shielding pad 297.

The light-shielding layer 295 is printed on one front edge of the light guiding member 210. The light-shielding layer 295 is formed of a light-reflecting material. The light-shielding layer 295 reflects the incident light, which is provided from the light source module 230, to the inside of the light guiding member 210, to thereby prevent the light leakage in the light-incidence portion of the backlight module 200.

The light-shielding pad 297 is disposed between the light source module 230 and the light-incidence surface 211 of the light guiding member 210, to thereby surround the plurality of light emitting diode devices 233. For example, the light-shielding pad 297 may be attached to an inner surface of the light source printed circuit board 231 so as to individually surround each of the plurality of light emitting diode devices 233. In this case, the light-shielding pad 297 may be formed in a shape of ladder. According to another example, the light-shielding pad 297 may be attached to an inner edge of the light source printed circuit board 231 so as to surround the plurality of light emitting diode devices 233 at once. In this case, the light-shielding pad 297 may be formed in a shape of rectangular band. Additionally, the light-shielding pad 297 may be interposed between the inner surface of the light source printed circuit board 231 and the rear cover 310.

The light-shielding pad 297 may be formed of a material having high hardness and good shock-absorbing power.

Meanwhile, the second connection member 510 of the backlight module 200, which is overlapped with one edge of the display panel 100, may be interposed between the light-shielding layer 295 of the front light-leaking prevention member 290-2 and one rear edge of the display panel 100.

In the display apparatus including the front light-leaking prevention member 290-2 according to the embodiment of the present disclosure, the thickness of the second connection member 510 may be increased due to the light-shielding layer 295 of the thin film printed on one front edge of the light guiding member 210. If the second connection member 510 is increased in its thickness, it is possible to enhance the light leakage prevention efficiency in the lateral surface of the backlight module 200 by the second connection member 510.

Figure 14:
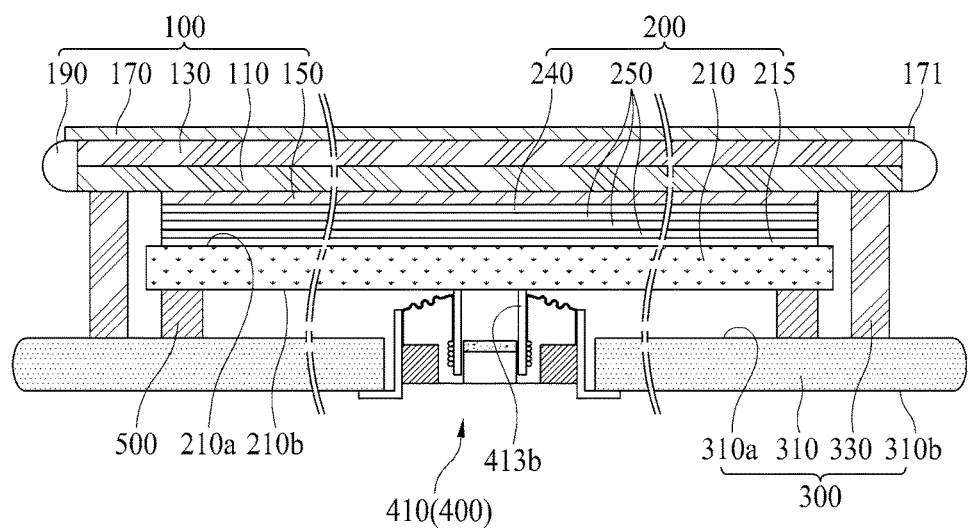
FIG. 14 is another cross sectional view along I-I' of FIG. 1 according to one embodiment of the present disclosure.

FIG. 14 is another cross sectional view along I-I' of FIG. 1, which is obtained by additionally providing a second transparent adhesion member to the backlight module. Hereinafter, only the structure of the second transparent adhesion member will be described in detail, and a detailed description for the other elements except the second transparent adhesion member will be omitted.

Referring to FIG. 14, the backlight module 200 according to the embodiment of the present disclosure may further include the second transparent adhesion member 214 interposed between the optical sheet portion 250 and the light guiding member 210.

The second transparent adhesion member 215 makes the entire rear surface of the optical sheet portion 250 be in contact with the front surface 210a of the light guiding member 210. That is, the optical sheet portion 250 is in contact with the entire front surface of the light guiding member 210 by the use of second transparent adhesion member 215.

For example, the second transparent adhesion member 215 may be optical clear adhesive (OCA), optical clear resin (OCR), porous optical clear adhesive (porous OCA), or porous optical clear resin (porous OCR). Preferably, the second transparent adhesion member 215 is formed of the porous OCA or porous OCR so as to refract the light, which is guided from the light guiding member 210, toward the rear surface of the optical sheet portion 250.

According to another example, the second transparent adhesion member 215 may be charged in the entire space between the front surface of the light guiding member 210 and the rear surface of the optical sheet portion 250 so as to smoothly transfer the vibration of the light guiding member 210 to the optical sheet portion 250 without any reduction of the vibration, preferably. However, if the second transparent adhesion member 215 has the relatively-high refractive index, the refractive index difference between the optical sheet and the light guiding member 210 is reduced so that the refraction or axis-direction reflection (the direction which is parallel to the thickness direction of the optical sheet portion 250) of the light guided by the light guiding member 210 is reduced, to thereby lower uniformity of luminance and efficiency of optical sheet. Thus, the second transparent adhesion member 215 is charged in the entire space between the front surface of the light guiding member 210 and the rear surface of the optical sheet portion 250, and is formed of a transparent adhesive material having the low refractive index of 1.0~1.5 so as to increase the refractive index difference between the optical sheet and the light guiding member 210, whereby it is possible to transfer the vibration of the light guiding member 210 to the optical sheet portion 250 without any reduction of the vibration, and to improve the luminance uniformity of the light guided by the light guiding member 210 and the efficiency of the optical sheet.

Meanwhile, the light guiding member 210 and the optical sheet portion 250 are connected with each other by the use of second transparent adhesion member 215 so that it is possible to omit the second connection member 510 shown in FIG. 10, wherein the function of the second connection member 510 is substituted by the lateral cover member 330 of the rear structure 300. However, as shown in FIGS. 11 to 13, the second connection member 510 disposed between the display panel 100 and the front light-leaking prevention member 290, 290-1, and 290-2 is not removed so as to prevent the light leakage in the backlight module 200, preferably.

In the display apparatus including the backlight module 200 according to the embodiment of the present disclosure, it is possible to remove the air gap which might be generated between the light guiding member 210 and the optical sheet portion 250, whereby the vibration of the light guiding member 210 may be transferred to the display panel 100 through the optical sheet portion 250 without any reduction of the vibration. Accordingly, in the display apparatus according to the embodiment of the present disclosure, the display panel 100 is vibrated without any reduction of sound pressure occurring by the multi-layered structure between the light guiding member 210 and the display panel 100 for the vibration transfer process, to thereby output the accurate sound.

Figure 15A:
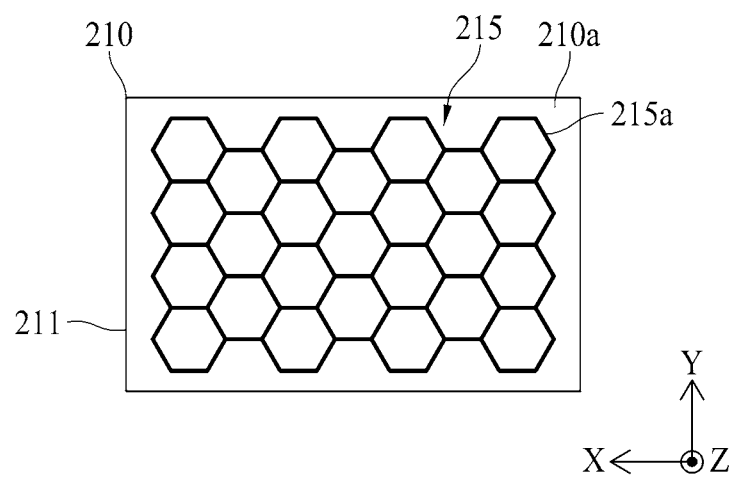
FIGS. 15A and 15B are plane views illustrating examples of second transparent adhesion members in the display apparatus according to the embodiment of the present disclosure.
Figure 15B:
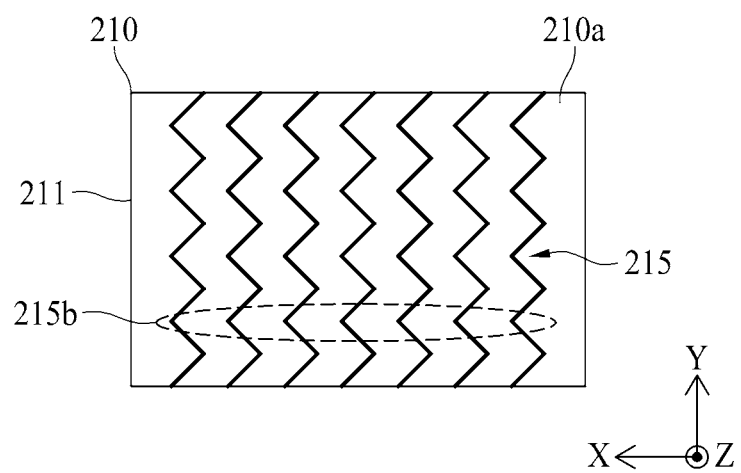

FIGS. 15A and 15B are plane views illustrating examples of the second transparent adhesion member in the display apparatus according to the embodiment of the present disclosure.

Referring to FIG. 15A, the second transparent adhesion member 215 according to one example of the present disclosure may include a plurality of polygonal patterns 215a.

Each of the plurality of polygonal patterns 215a may have a shape with at least three angles, and the adjoining polygonal patterns 215 are connected with each other without being separated from each other. Each of the plurality of polygonal patterns 215 may have a hexagonal shape. In this case, the second transparent adhesion member 215 according to one embodiment of the present disclosure may have a honeycomb pattern. Each of the plurality of polygonal patterns 215a transfers the vibration of the light guiding member 210 to the optical sheet portion 250 through a contact portion between the light guiding member 210 and the optical sheet portion 250. In this case, the vibration of the light guiding member 210 may be attenuated by the air gap existing between the light guiding member 210 and the optical sheet portion 250 for the process of transferring the vibration of the light guiding member 210 to the optical sheet portion 250. According to this embodiment of the present disclosure, the rate of air gap existing between the light guiding member 210 and the optical sheet portion 250 may be reduced by the size occupied by the plurality of polygonal patterns 215a so that it is possible to reduce the attenuation of the vibration transferred from the light guiding member 210 to the optical sheet portion 250 by the reduced rate of the air gap. Also, each of the plurality of polygonal patterns 215a reduces the air gap between the light guiding member 210 and the optical sheet portion 250 through the non-contact area between the light guiding member 210 and the optical sheet portion 250, to thereby improve the luminance uniformity of the light guided by the light guiding member 210 and the efficiency of the optical sheet. Accordingly, the second transparent adhesion member 215 according to the embodiment of the present disclosure transfers the vibration of the light guiding member 210 to the optical sheet portion 250, and also improves the luminance uniformity of the light guided by the light guiding member 210 and the efficiency of the optical sheet.

Meanwhile, if the contact rate of the second transparent adhesion member 215 to the entire size of the light guiding member 210 becomes higher, the vibration transfer properties of the second transparent adhesion member 215 may be improved, and the light refraction properties of the second transparent adhesion member 215 may be lowered. According to one example, the contact rate of the second transparent adhesion member 215 to the entire size of the light guiding member 210 is set to be less than 50%. According to another example, in the display apparatus which uses the display panel as the vibrating plate for the sound output, the light refraction properties of the second transparent adhesion member 215 may be more important than the vibration transfer properties of the second transparent adhesion member 215. In this case, the contact rate of the second transparent adhesion member 215 to the entire size of the light guiding member 210 is set to be 1%~10%, preferably.

The display apparatus according to the embodiment of the present disclosure includes the second transparent adhesion member 215 having the plurality of polygonal patterns 215a so that it is possible to improve the luminance properties of the backlight module 200, and to output the sound to the front direction of the display panel 100 by the use of vibration of the display panel 100.

Referring to FIG. 15B, the second trans adhesion member 215 according to another example of the present disclosure may include a plurality of line patterns 215b which are parallel to one another and are provided at fixed intervals.

Each of the plurality of line patterns 215b extends along the vertical axis direction (Y) which is parallel to the light-incidence surface 211 of the light guiding member 210, and the plurality of line patterns 215b are provided at fixed intervals along the horizontal axis direction (X) which is perpendicular to the vertical axis direction (Y). In the same manner as the aforementioned polygonal pattern 215a, each of the plurality of line patterns 215b transfers the vibration of the light guiding member 210 to the optical sheet portion 250 through a contact portion between the light guiding member 210 and the optical sheet portion 250, and prepares an air gap between the light guiding member 210 and the optical sheet portion 250 through the non-contact area between the light guiding member 210 and the optical sheet portion 250. Accordingly, the second transparent adhesion member 215 transfers the vibration of the light guiding member 210 to the optical sheet portion 250, and improves the luminance uniformity of the light guided by the light guiding member 210 and the efficiency of the optical sheet through the air gap.

In this case, an interval space between the adjoining line patterns 215b prepares the air gap between the light guiding member 210 and the optical sheet portion 250, and provides a passage for discharging bubbles between the light guiding member 210 and the optical sheet portion 250 for the process of adhering the light guiding member 210 and the optical sheet portion 250 to each other, to thereby prevent adhesion defects between the light guiding member 210 and the optical sheet portion 250.

Meanwhile, if each of the plurality of line patterns 215b has a straight-line shape, it may cause non-uniform linear luminance by the light which is guided by the light guiding member 210 and passes through each of the plurality of line patterns 215b. In order to minimize the non-uniform linear luminance, each of the plurality of line patterns 215b is prepared in a zigzag shape along the vertical axis direction (Y), preferably. In this case, the adjoining two line patterns 215b may be symmetric to each other.

Accordingly, the display apparatus according to the embodiment of the present disclosure includes the second transparent adhesion member 215 with the plurality of line patterns 215b so that it is possible to improve the luminance properties of the backlight module 200, and to output the sound to the front direction of the display panel 100 by the use of vibration of the display panel 100 in accordance with the vibration of the light guiding member 210.

Figure 16:
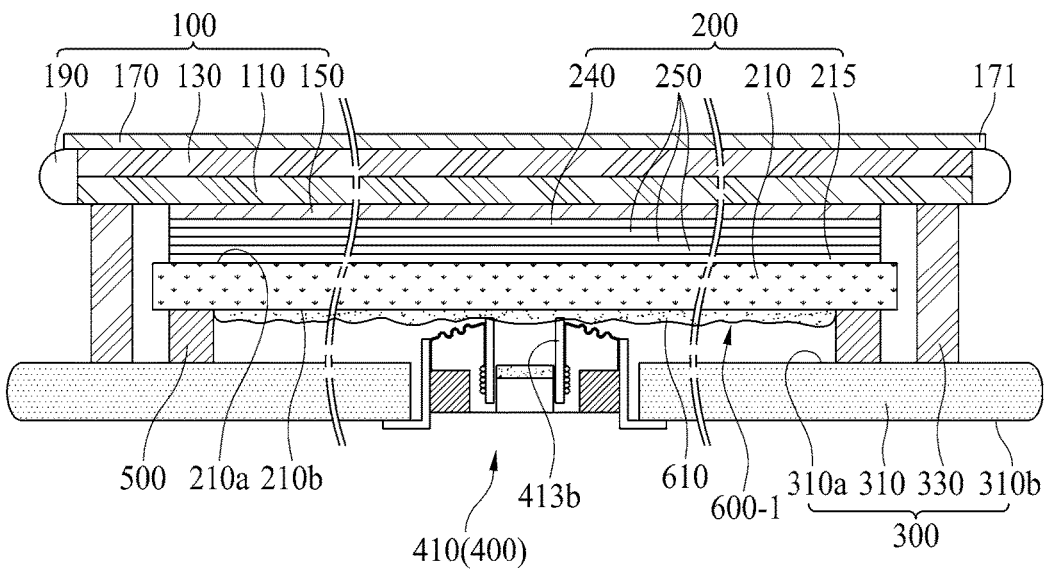
FIGS. 16 to 18 are other cross sectional views along I-I' of FIG. 1 according to one embodiment of the present disclosure.
Figure 17:
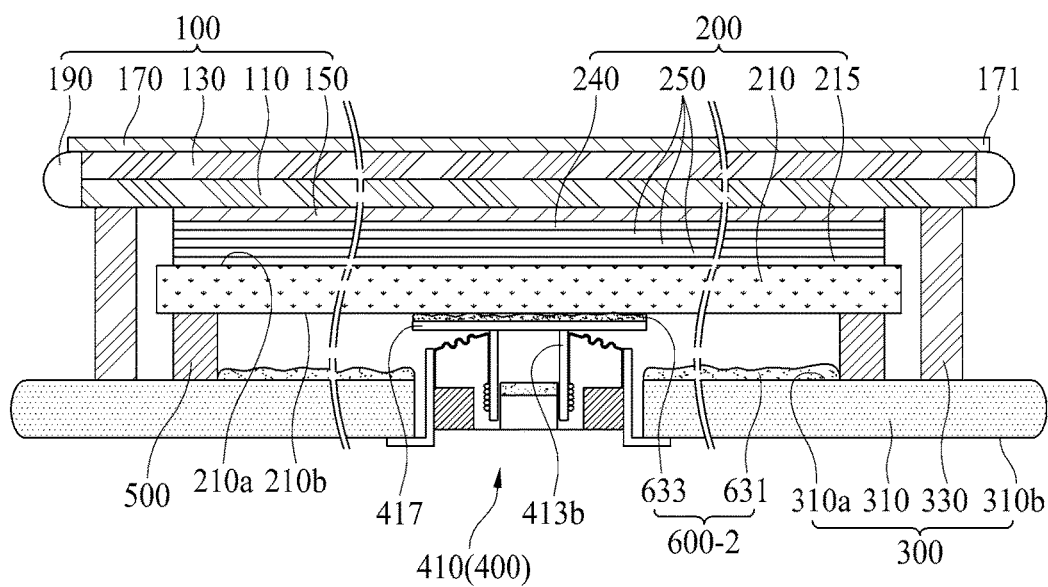
Figure 18:
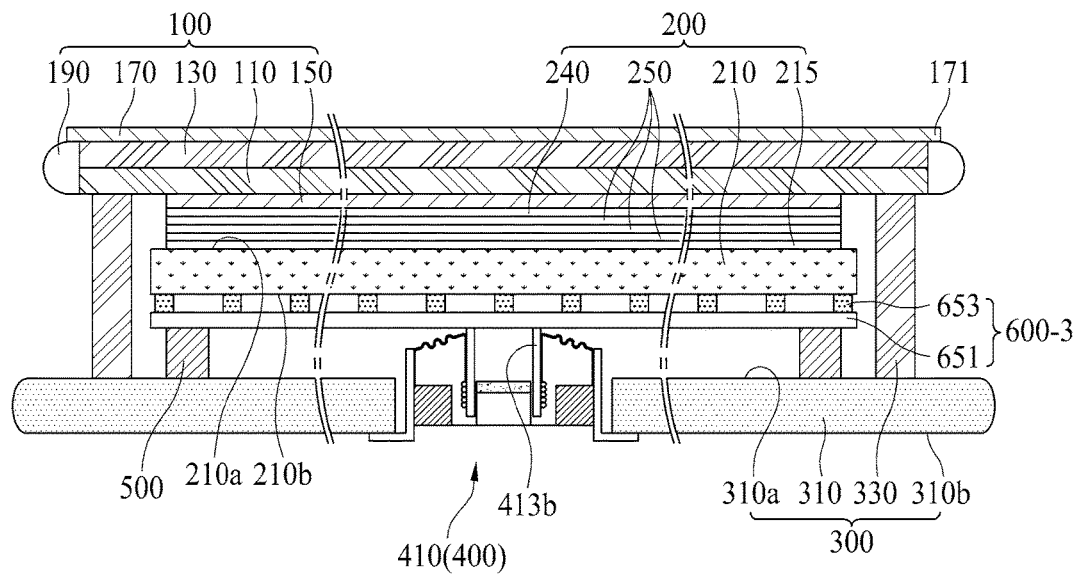

FIGS. 16 to 18 are other cross sectional views along I-I' of FIG. 1, which are obtained by additionally providing a rear light-leaking prevention member to the display apparatus according to the embodiment of the present disclosure. Hereinafter, only the structure of the rear light-leaking prevention member will be described in detail, and a detailed description for the other elements except the rear light-leaking prevention member will be omitted.

First, as shown in FIG. 16, the rear light-leaking prevention member 600-1 according to the embodiment of the present disclosure may include a rear coating layer 610 prepared on the rear surface 210b of the light guiding member 210.

The rear coating layer 610 according to one embodiment of the present disclosure may include a plurality of beads which are formed of a reflective material, wherein the plurality of beads respectively have the different sizes and shapes. According as the plurality of beads respectively have the different sizes and shapes, it makes a diffuse reflection of light which is incident on the rear coating layer 610.

Meanwhile, the rear coating layer 610 is connected with the vibration generating device 400. That is, the elevating member 413b for the sound generating module 410 of the vibration generating device 400 is connected with the rear coating layer 610. In this case, the elevating member 413b may be connected with the rear coating layer 610 by the use of double-sided tape or adhesive.

The rear light-leaking prevention member 600-1 according to the embodiment of the present disclosure includes the rear coating layer 610 directly coated onto the rear surface 210b of the light guiding member 210 so that it is possible to minimize or prevent the light leakage in the rear surface of the light guiding member 210.

Next, as shown in FIG. 17, the rear light-leaking prevention member 600-2 according to the embodiment of the present disclosure may include a first coating layer 631 prepared on the rear cover 310 of the rear structure 300 confronting the light guiding member 210, and a second coating layer 633 prepared in the vibration generating device 400 confronting the light guiding member 210.

The first coating layer 631 is coated onto the front surface 310a of the rear cover 310 except the perforation 310h prepared in the rear cover 310. The first coating layer 631 includes a plurality of beads which are formed of a reflective material, wherein the plurality of beads respectively have the different sizes and shapes. According as the plurality of beads respectively have the different sizes and shapes, it makes a diffuse reflection of light which is incident on the first coating layer 631 via the rear surface 210b of the light guiding member 210.

The second coating layer 633 is coated onto the sound generating module 410 of the vibration generating device 400. To this end, the sound generating module 410 further includes a cover plate 417 having a plate shape connected with the elevating member 413b and provided with the second coating layer 633. The cover plate 417 is connected with the rear surface 210b of the light guiding member 210, to thereby transfer the vibration of the elevating member 413b to the rear surface 210b of the light guiding member 210. The second coating layer 633 includes a plurality of beads which are formed of a reflective material, wherein the plurality of beads respectively have the different sizes and shapes. According as the plurality of beads respectively have the different sizes and shapes, it makes a diffuse reflection of light which is incident on the second coating layer 633 through the rear surface 210b of the light guiding member 210.

A rear surface of the cover plate 417 may be connected with the elevating member 413b by the use of first double-sided tape, and the second coating layer 633 coated onto a front surface of the cover plate 417 may be attached to the rear surface 210b of the light guiding member 210 by the use of first double-sided tape.

Meanwhile, in case of the rear light-leaking prevention member 600-2 according to the embodiment of the present disclosure, each of the first coating layer 631 and the second coating layer 633 may be substituted by a reflective sheet or reflective film.

Accordingly, the rear light-leaking prevention member 600-2 according to the embodiment of the present disclosure includes the first coating layer 631 prepared in the rear cover 310, and the second coating layer 633 prepared in the cover plate 417 of the sound generating module 410, to thereby minimize or prevent the light leakage in the rear surface of the light guiding member 210.

Then, as shown in FIG. 18, the rear light-leaking prevention member 600-3 according to the embodiment of the present disclosure may include a reflective sheet 651 adhered onto the rear surface 210b of the light guiding member 210.

The reflective sheet 651 is adhered onto the entire rear surface 210b of the light guiding member 210 by the use of third transparent adhesion member 653. The reflective sheet 651 totally reflects the light, which is incident on the rear surface 210b of the light guiding member 210, to the inside of the light guiding member 210, to thereby minimize or prevent the light leakage in the rear surface of the light guiding member 210.

For example, the third transparent adhesion member 653 may be optical clear adhesive (OCA), optical clear resin (OCR), porous optical clear adhesive (porous OCA), or porous optical clear resin (porous OCR). Preferably, the third transparent adhesion member 653 is formed of the porous OCA or porous OCR so as to totally reflect the light, which is incident on the reflective sheet 651 through the rear surface 210b of the light guiding member 210, on the reflective sheet 651.

According to another example, the third transparent adhesion member 653 may be formed of a transparent adhesion material having the low refractive index of 1.0~1.5 so as to totally reflect the light, which is incident on the reflective sheet 651 through the rear surface 210b of the light guiding member 210, on the reflective sheet 651.

According to another example, the third transparent adhesion member 653 may include a plurality of polygonal patterns 215 shown in FIG. 15A, or a plurality of line patterns 215b shown in FIG. 15B. In this case, the total-reflection properties of the reflective sheet 651 may be improved by the plurality of polygonal patterns 215a or the plurality of line patterns 215b, or the air gap prepared between the light guiding member 210 and the reflective sheet 651.

Meanwhile, the reflective sheet 651 is connected with the sound generating device 400. That is, the elevating member 413b for the sound generating module 410 of the vibration generating device 400 is connected with the rear surface of the reflective sheet 651. In this case, the elevating member 413b is connected with the rear surface of the reflective sheet 651 by the use of double-sided tape or adhesive. Accordingly, the vibration of the elevating member 413b may be transferred to the light guiding member 210 through the reflective sheet 651 and the third transparent adhesion member 653.

As the rear light-leaking prevention member 600-3 according to the embodiment of the present disclosure includes the reflective sheet 651, it is possible to minimize or prevent the light leakage in the rear surface of the light guiding member 210.

Figure 19:
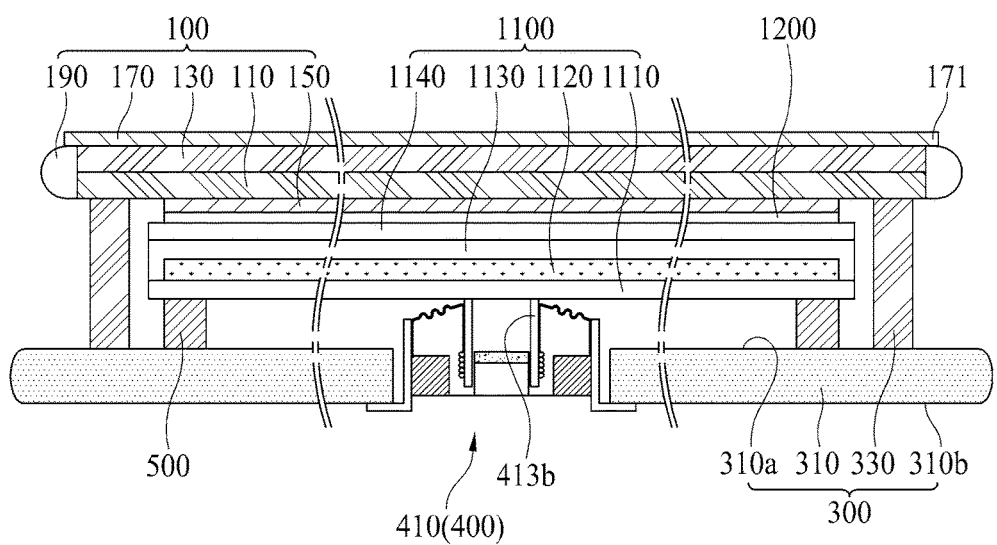
FIG. 19 is a cross sectional view illustrating a display apparatus according to another embodiment of the present disclosure.

FIG. 19 is a cross sectional view illustrating a display apparatus according to another embodiment of the present disclosure, which is obtained by changing a structure of the backlight module in the display apparatus shown in FIG. 2. Hereinafter, only the structure of the backlight module will be described in detail, and a detailed description for the other elements except the backlight module will be omitted.

Referring to FIG. 19, the backlight module 200 according to the embodiment of the present disclosure may include a surface light source panel 1100.

The surface light source panel 1100 is disposed on a rear surface 100b of a display panel 100, and is connected with an elevating member 413b for a sound generating module 410 of a vibration generating device 400. The surface light source panel 1100 is driven by an illumination driving circuit, to thereby irradiate the rear surface 100b of the display panel 100 with light, and to transfer a vibration in accordance with an elevating movement of the elevating member 413b for the sound generating module 410 to the display panel 100. Accordingly, the display panel 100 displays an image by the use of light provided from the surface light source panel 1100, and vibrates in accordance with a vibration of the sound generating module 410 transmitted through the surface light source panel 1100 so as to output sound to a front direction.

The surface light source panel 1100 according to one embodiment of the present disclosure may include a base substrate 1110, a self-light emitting device layer 1120, a protection layer 1130, and a cover plate 1140.

The base substrate 1110 may include a light-transmitting plastic or glass material. The base substrate 1110 is connected with the elevating member 413b for the sound generating module 410, and is vibrated in accordance with the elevating movement of the elevating member 413b. Also, the base substrate 1110 is connected with a rear cover 310 of a rear structure 300 by the use of first connection member 500 described above.

The self-light emitting device layer 1120 includes a driving circuit layer prepared on the base substrate 110, and a self-light emitting device connected with the driving circuit layer.

The driving circuit layer includes a driving circuit for driving the self-light emitting device in accordance with a passive matrix driving method or active matrix driving method. Furthermore, the driving circuit layer of the active matrix driving method drives the self-light emitting device on the basis of light source data supplied by a global dimming method or local dimming method.

The self-light emitting device emits light by a current supplied from the driving circuit layer.

The self-light emitting device according to one example of the present disclosure includes a self-light emitting layer which emits light by a current supplied from the driving circuit layer. The self-light emitting device layer according to one example of the present disclosure may include an organic light emitting layer or quantum dot light emitting layer.

The self-light emitting device according to another example of the present disclosure may include a micro light emitting diode which emits light by a current supplied from the driving circuit layer.

The protection layer 1130, which is prepared on the base substrate 1110, covers the self-light emitting device layer 1120, to thereby protect the self-light emitting device layer 1120.

The cover substrate 1140 is attached to the protection layer 1130, to thereby protect the protection layer 1130 and the self-light emitting device layer 1120 from an external shock. The cover substrate 1140 according to one embodiment of the present disclosure may include a light-transmitting plastic or glass material.

The surface light source panel 1100 according to the embodiment of the present disclosure is connected with the rear surface 100b of the display panel 100 by the use of transparent adhesion member 1200.

The transparent adhesion member 1200 is interposed between the display panel 100 and the cover substrate 1140 of the surface light source panel 1100, whereby the surface light source panel 1100 is connected with an entire rear surface of a lower polarizing member 150 included in the display panel 100.

The transparent adhesion member 1200 may be attached to an entire front surface of the surface light source panel 1100 so as to prevent an air gap between the display panel 100 and the surface light source panel 1100. In this case, a vibration of the surface light source panel 1100 by the sound generating module 410 is transferred to the display panel 100 through the transparent adhesion member 1200. If there is the air gap between the display panel 100 and the surface light source panel 1100, the vibration transferred to the display panel 100 is reduced by the air gap. In order to transfer the vibration of the surface light source panel 1100 to the display panel 100 without any reduction of the vibration, the transparent adhesion member 1200 is interposed between the surface light source panel 1100 and the display panel 100 without the air gap, preferably.

The transparent adhesion member 1200 according to one embodiment of the present disclosure may be an optical adhesive or optical adhesion film, but not limited to these types. For example, the transparent adhesion member 1200 may be optical clear adhesive (OCA) or optical clear resin (OCR).

The display apparatus according to the embodiment of the present disclosure uses the display panel 100 which vibrates through the backlight module 200 including the surface light source panel 110 as a vibrating plate of a sound device so that the sound is output to the front side of the display panel 100 instead of the rear and lower sides of the display panel 100, thereby enhancing a user's sense of immersion by realizing accuracy of sound transmission and improving sound quality, and realizing slimness in the display apparatus.

Figure 20:
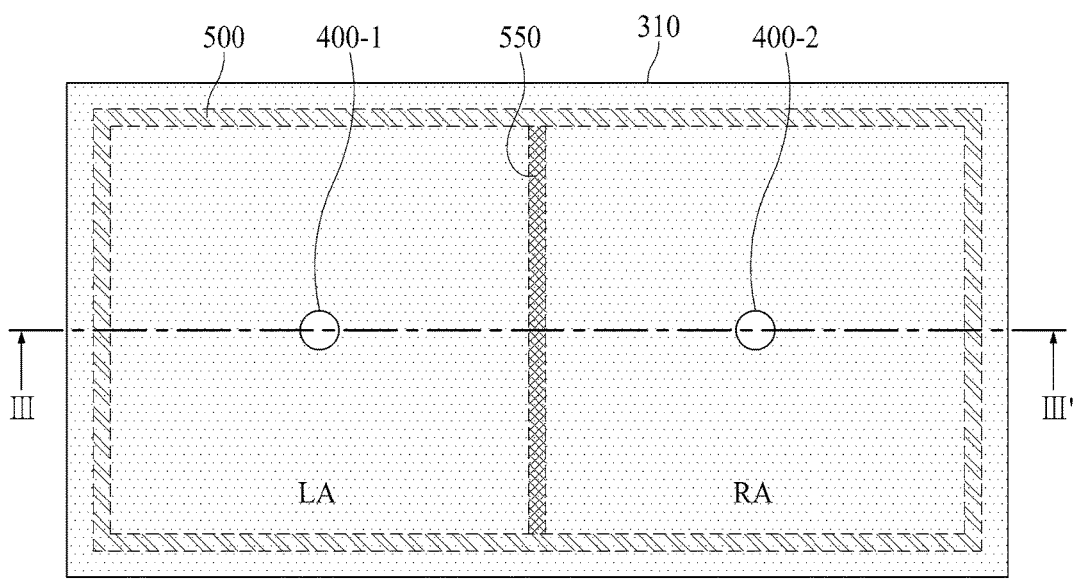
FIG. 20 is a rear view illustrating the display apparatus according to another embodiment of the present disclosure.
Figure 21:
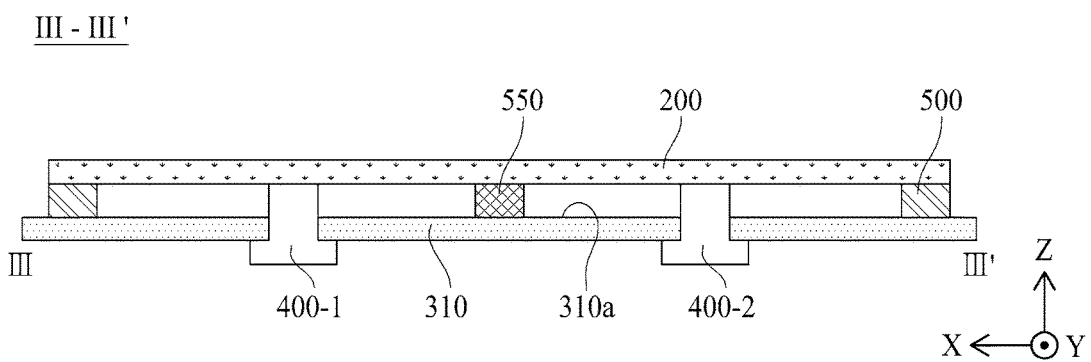
FIG. 21 is a cross sectional view along of FIG. 20 according to one embodiment of the present disclosure.

FIG. 20 is a rear view illustrating the display apparatus according to another embodiment of the present disclosure, and FIG. 21 is a cross sectional view along III-III' of FIG. 20, which show a connection structure between the backlight module and the rear structure, and a structure of the vibration generating device in the display apparatus shown in FIG. 2. Hereinafter, only the connection structure between the backlight module and the rear structure, and the structure of the vibration generating device will be described in detail, and a detailed description for the other elements will be omitted.

Referring to FIGS. 20 and 21, in case of the display apparatus according to another embodiment of the present disclosure, the vibration generating device 400 includes first and second sound generating modules 400-1 and 400-2.

The first sound generating module 400-1 is disposed in a rear left area (LA) of the backlight module 200. The first sound generating module 400-1 is connected with the center of the rear left area (LA) of the backlight module 200, to thereby vibrate a rear right area of the display panel 100 through the rear right area of the backlight module 200.

The second sound generating module 400-2 is disposed in a rear right area (RA) of the backlight module 200. The second sound generating module 400-2 is connected with the center of the rear right area (RA) of the backlight module 200, to thereby vibrate a rear right area of the display panel 100 through the rear right area of the backlight module 200.

Each of the first and second sound generating modules 400-1 and 400-2 according to one embodiment of the present disclosure, as shown in FIG. 4, may include a module frame 411, a magnetic circuit unit 413, and a damper 415, wherein a description for a detailed structure of each sound generating module will be omitted.

Each of the first and second sound generating modules 400-1 and 400-2 according to another embodiment of the present disclosure may include two or more sub sound generating modules which are parallel to each other, and are provided at a predetermined interval from each other. As shown in FIG. 4, each of the sub sound generating modules may include a module frame 411, a magnetic circuit unit 413, and a damper 415, wherein a description for a detailed structure of each sub sound generating module will be omitted.

The display apparatus according another embodiment of the present disclosure may further include a partition member 550.

The partition member 550 together with the aforementioned first connection member spatially divides the rear surface of the backlight module 200 into the rear left area (LA) and the rear right area (RA) so that it is possible to prevent an interference of sound between the rear left area (LA) and the rear right area (RA). That is, the partition member 550 is disposed at the rear surface of the backlight module 200 overlapped with the middle region between the first and second sound generating modules 400-1 and 400-2, whereby the rear left area (LA) and the rear right area (RA) are spatially separated from each other. In this case, the first connection member 500 surrounds the periphery of each of the rear left area (LA) and the rear right area (RA) defined on the rear surface of the backlight module 200. Accordingly, the rear left area (LA) and the rear right area (RA) defined on the rear surface of the backlight module 200 are spatially separated from each other by the first connection member 500 and the partition member 550.

The partition member 550 according to one embodiment of the present disclosure is interposed between the backlight module 200 and the rear cover 310. For example, the partition member 550, which is formed of foam pad, single-sided tape, or double-sided tape, is adhered to the front surface 310a of the rear cover 310. Meanwhile, the partition member 550 may be in contact with the rear surface of the backlight module 200 while being adhered or not adhered to the rear surface of the backlight module 200.

The partition member 550 separates the sound of the first sound generating module 400-1 from the sound of the second sound generating module 400-2 so that the sound of 2.0 channel type is output from the display panel 100 in accordance with the vibration of the display panel 100.

The display apparatus according to the embodiment of the present disclosure uses the display panel 100 which vibrates through the backlight module 200 as a vibrating plate of a sound device so that the sound of 2.0 channel type is output to the front side of the display panel 100 instead of the rear and lower sides of the display panel 100, thereby enhancing a user's sense of immersion by realizing accuracy of sound transmission and improving sound quality.

Figure 22:
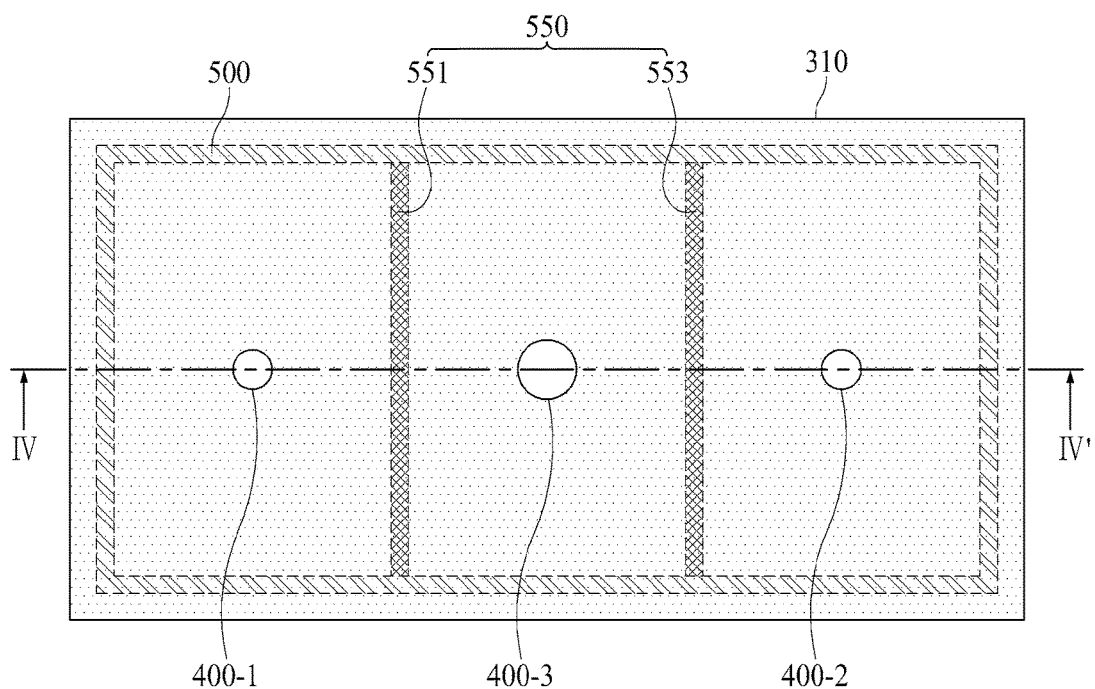
FIG. 22 is a rear view illustrating the display apparatus according to another embodiment of the present disclosure.
Figure 23:
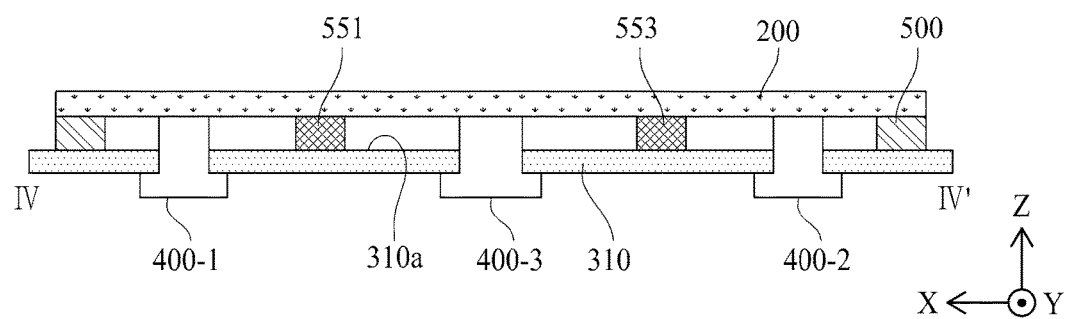
FIG. 23 is a cross sectional view along IV-IV' of FIG. 22 according to one embodiment of the present disclosure.

FIG. 22 is a rear view illustrating a display apparatus according to another embodiment of the present disclosure, and FIG. 23 is a cross sectional view along IV-IV' of FIG. 22, which are obtained by changing a structure of each of the vibration generating device and the partition member in the display apparatus shown in FIGS. 20 and 21. Hereinafter, only the structure of each of the vibration generating device and the partition member will be described in detail, and a detailed description for the other elements will be omitted.

Referring to FIGS. 22 and 23, in the display apparatus according to the embodiment of the present disclosure, the vibration generating device 400 includes first to third sound generating modules 400-1, 400-2, and 400-3.

The first sound generating module 400-1 is disposed in a rear left area (LA) of the backlight module 200. The first sound generating module 400-1 is connected with the center of the rear left area (LA) of the backlight module 200, to thereby vibrate a left area of the display panel 100 through the rear left area of the backlight module 200. The first sound generating module 400-1 according to one embodiment of the present disclosure vibrates the left area of the display panel 100 through the rear left area of the backlight module 200, to thereby generate middle-range and high-range sound.

The second sound generating module 400-2 is disposed in a rear right area (RA) of the backlight module 200. The second sound generating module 400-2 is connected with the center of the rear right area (RA) of the backlight module 200, to thereby vibrate a right area of the display panel 100 through the rear right area of the backlight module 200. The second sound generating module 400-2 according to one embodiment of the present disclosure vibrates the right area of the display panel 100 through the rear right area of the backlight module 200, to thereby generate middle-range and high-range sound.

The third sound generating module 400-3 is disposed in the rear central area (CA) between the rear left area (LA) and the rear right area (RA) of the backlight module 200. The third sound generating module 400-3 is connected with the center of the rear central area (CA) of the backlight module 200, to thereby vibrate a central area of the display panel 100 through the rear central area (CA) of the backlight module 200. The third sound generating module 400-3 according to one embodiment of the present disclosure vibrates the central area of the display panel 100 through the rear central area of the backlight module 200, to thereby generate low-range sound.

Each of the first to third sound generating modules 400-1, 400-2, and 400-3 according to one embodiment of the present disclosure, as shown in FIG. 4, may include a module frame 411, a magnetic circuit unit 413, and a damper 415, wherein a description for a detailed structure of each sound generating module will be omitted.

Each of the first to third sound generating modules 400-1, 400-2, and 400-3 according to another embodiment of the present disclosure may include two or more sub sound generating modules which are parallel to each other, and are provided at a predetermined interval from each other. As shown in FIG. 4, each of the sub sound generating modules may include a module frame 411, a magnetic circuit unit 413, and a damper 415, wherein a description for a detailed structure of each sub sound generating module will be omitted.

A partition member 550 together with the aforementioned first connection member 500 spatially divides the rear surface of the backlight module 200 into the rear left area (LA), the rear right area (RA), and the rear central area (CA) so that it is possible to prevent an interference of sound among the rear left area (LA), the rear right area (RA), and the rear central area (CA). In this case, the first connection member 500 surrounds the periphery of each of the rear left area (LA), the rear right area (RA), and the rear central area (CA) defined on the rear surface of the backlight module 200. Accordingly, the rear left area (LA), the rear right area (RA), and the rear central area (CA) defined on the rear surface of the backlight module 200 are spatially separated from one another by the first connection member 500 and the partition member 550.

The partition member 550 according to one embodiment of the present disclosure includes a first partition 551 disposed between the rear central area (CA) and the rear left area (LA), and a second partition 553 disposed between the rear central area (CA) and the rear right area (RA).

Each of the first and second partitions 551 and 553 is interposed between the backlight module 200 and the rear cover 310. The first and second partitions 551 and 553 are symmetric to each other with respect to the rear central area (CA), wherein the first and second partitions 551 and 553 may have the same structure. For example, each of the first and second partitions 551 and 553, which is formed of foam pad, single-sided tape, or double-sided tape, is adhered to the front surface 310a of the rear cover 310. Meanwhile, each of the first and second partitions 551 and 553 may be in contact with the rear surface of the backlight module 200 while being adhered or not adhered to the rear surface of the backlight module 200.

Accordingly, the first and second partitions 551 and 553 separate the low-range sound generated in the rear central area (CA) from the middle-range and high-range sound generated in the rear left area (LA) and the rear right area (RA), whereby the sound of 2.1 channel type is output from the display panel 100 in accordance with the vibration of the display panel 100.

In this embodiment of the present disclosure, the low-range sound is defined as the sound of 200 Hz or less than 200 Hz, the middle-range sound is defined as the sound between 200 Hz and 1.3 kHz, and the high-range sound is defined as the sound of 1.3 kHz or more than 1.3 kHz, but not limited to these ranges.

In the display apparatus according to the embodiment of the present disclosure, the low-range sound is generated by indirectly vibrating the central area (CA) of the display panel 100 through the use of third sound generating module 400-3, and the middle-range and high-range sound is generated by indirectly vibrating each of the left area (LA) and the right area (RA) of the display panel 100 through the use of first and second actuators 400-1 and 400-2. Accordingly, in case of the display apparatus according to the embodiment of the present disclosure, the sound of 2.1 channel type is output to the front side of the display panel 100 instead of the rear and lower sides of the display panel 100 by the use of woofer output in accordance with the vibration of the central area (CA) of the display panel 100 and left and right stereo sound output from the left area (LA) and the right area (RA) of the display panel 100, thereby enhancing a user's sense of immersion by realizing accuracy of sound transmission and improving sound quality.

In the aforementioned display apparatus according to the embodiment of the present disclosure, the sound of 2.0 or 2.1 channel type is output to the front direction of the display panel 100 by the vibration of the display panel 100, but not limited to these types. For example, the display apparatus according to the present disclosure may realize the sound of the channel type above 2.0 through the vibration of the display panel 100, or may realize the sound of the channel type above 2.0 through the rear-side sound and the left/right/upper/lower-side sound of the display panel 100 by the plurality of sound generating modules together with the front-side sound in accordance with the vibration of the display panel 100, to thereby enhance a user's sense of immersion.

The aforementioned display apparatus according to the embodiment of the present disclosure is formed in the plate type, but not limited to this structure. The embodiments of the present disclosure may be applied to a curved type display apparatus provided with a curved type display panel, a curved type backlight module, and a curved type rear structure. In this case, it is possible to enhance a user's sense of immersion in both video and sound.

The display apparatus according to the embodiment of the present disclosure may include the display panel having the front surface for displaying an image and the rear surface irradiated with light, the backlight module connected with the rear surface of the display panel, the rear structure for surrounding the backlight module, and the vibration generating device for vibrating the display panel through the use of backlight module, wherein the vibration generating device is fixed to the rear structure.

According to one embodiment of the present disclosure, the vibration generating device, which penetrates through the rear structure, is in contact with the rear surface of the backlight module, to thereby vibrate the backlight module. The display panel is vibrated together with the vibration of the backlight module, whereby the sound is output to the front direction.

According to one embodiment of the present disclosure, the rear structure may include the perforation, wherein some of the vibration generating device is inserted into the perforation.

According to one embodiment of the present disclosure, the vibration generating device includes at least one sound generating module for vibrating the display panel through the backlight module, wherein the sound generating module is fixed to the rear structure. At least one sound generating module may include the module frame which is fixed to the rear structure and provided with some area of the perforation inserted thereinto, the magnetic circuit unit, provided in the module frame, for vibrating the backlight module, and the damper prepared between the module frame and the magnetic circuit unit.

According to one embodiment of the present disclosure, the magnetic circuit unit includes the magnet member provided in the module frame, the elevating member provided at the internal side or external side of the magnet member and be in contact with the rear surface of the backlight module, the coil wound on the elevating member, and the elevating guider inserted into the elevating member and provided to guide the elevating movement of the elevating member, wherein the damper may be provided between the elevating member and the module frame.

According to one embodiment of the present disclosure, the vibration generating device includes at least one sound generating module for vibrating the display panel through the backlight module, wherein at least one sound generating module is fixed to the rear structure, and at least one sound generating module vibrates the backlight module in accordance with the current applied based on Fleming's left hand rule.

The display apparatus according to one embodiment of the present disclosure may further include the fixing member for fixing the vibration generating device to the rear surface of the rear structure.

According to one embodiment of the present disclosure, the fixing member may be double-sided tape or adhesive.

According to one embodiment of the present disclosure, the fixing member includes the fixing frame attached to the rear surface of the rear structure, and the fastening means for fixing the vibration generating device to the fixing frame.

The display apparatus according to one embodiment of the present disclosure may further include the partition member disposed between the backlight module and the rear structure and provided to divide the rear surface of the backlight module into at least two areas. The vibration generating device includes at least two sound generating modules for vibrating the display panel through the backlight module, wherein at least two sound generating modules are disposed in the corresponding areas and are fixed to the rear structure. Each of at least two sound generating modules may include at least one actuator.

According to one embodiment of the present disclosure, the display panel is vibrated in accordance with the driving of the vibration generating device, to thereby output the sound of 2.0 channel type or 2.1 channel type to the front direction.

According to one embodiment of the present disclosure, the backlight module includes the light guiding member provided with the light-incidence surface and disposed on the rear surface of the display panel, the optical sheet portion disposed on the front surface of the light guiding member and connected with the rear surface of the display panel, and the light source module for emitting light to the light-incidence surface of the light guiding member. The light guiding member is vibrated by the vibration generating device, and the display panel may be vibrated by the vibration transferred from the light guiding member.

According to one embodiment of the present disclosure, the backlight module further includes the transparent adhesion member interposed between the optical sheet portion and the light guiding member. The optical sheet portion includes at least two optical sheets disposed between the display panel and the light guiding member and adhered to each other by the use of sheet adhesion member. Among at least two optical sheets, the lowermost optical sheet directly facing the light guiding member may be adhered to the front surface of the light guiding member by the use of transparent adhesion member.

According to one embodiment of the present disclosure, the transparent adhesion member may include the honeycomb pattern or the plurality of line patterns provided at fixed intervals.

According to one embodiment of the present disclosure, the transparent adhesion member may include the plurality of line patterns formed in the zigzag shape and provided at fixed intervals.

The display apparatus according to one embodiment of the present disclosure may further include the rear light-leaking prevention member for preventing the light leakage in the rear surface of the light guiding member. The vibration generating device may vibrate the light guiding member through the rear surface of the rear light-leaking prevention member.

According to one embodiment of the present disclosure, the rear light-leaking prevention member may include the rear coating layer directly coated onto the rear surface of the light guiding member, or the reflective sheet attached to the rear surface of the light guiding member.

According to one embodiment of the present disclosure, the rear light-leaking prevention member includes the reflective sheet attached to the rear surface of the light guiding member, wherein the reflective sheet may be adhered onto the rear surface of the light guiding member by the use of transparent adhesion member.

According to one embodiment of the present disclosure, the transparent adhesion member may include the honeycomb pattern or the plurality of line patterns provided at fixed intervals.

According to one embodiment of the present disclosure, there are the first connection member interposed between the rear edge of the light guiding member and the front edge of the rear structure, and the second connection member interposed between the rear edge of the display panel and the front edge of the light guiding member, wherein the optical sheet portion is surrounded by the second connection member.

The display apparatus according to one embodiment of the present disclosure may further include the lateral cover member interposed between the rear edge of the display panel and the front edge of the rear structure.

According to one embodiment of the present disclosure, the backlight module includes the surface light source panel connected with the rear surface of the display panel and connected with the vibration generating device, wherein the surface light source panel is vibrated by the vibration generating device, and the display panel may be vibrated by the vibration transferred from the surface light source panel.

According to one embodiment of the present disclosure, the surface light source panel may include the self-light emitting device layer having any one among the organic light emitting layer, the quantum dot light emitting layer, and the micro light emitting diode.

According to one embodiment of the present disclosure, the display panel, the backlight module, and the rear structure may be bent in the curved shape.

According to the present disclosure, the display apparatus outputs the sound to the front direction of the display panel through the vibration of the display panel so that it is possible to enhance a user's sense of immersion by realizing accuracy of sound transmission and improving sound quality.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:
1. A display apparatus comprising:
a display panel having a front surface for displaying an image, and a rear surface irradiated with light;
a backlight module connected with the rear surface of the display panel;
a rear structure for surrounding the backlight module; and
a vibration generating device for vibrating the display panel through the backlight module, wherein the vibration generating device is fixed to the rear structure.

2. The display apparatus according to claim 1,
wherein the vibration generating device, which penetrates through the rear structure, is in contact with a rear surface of the backlight module so as to vibrate the backlight module, and
the display panel is vibrated together with the vibration of the backlight module so as to output sound to a front direction.

3. The display apparatus according to claim 2, wherein the rear structure includes a perforation into which some of the vibration generating device is inserted.

4. The display apparatus according to claim 3,
wherein the vibration generating device includes at least one sound generating module fixed to the rear structure and provided to vibrate the display panel through the backlight module,
wherein the at least one sound generating module includes:
a module frame fixed to the rear structure and partially inserted into the perforation of the rear structure;
a magnetic circuit unit disposed in the module frame and provided to vibrate the backlight module; and
a damper disposed between the module frame and the magnetic circuit unit.

5. The display apparatus according to claim 4, wherein the magnetic circuit unit includes:
a magnet member provided in the module frame;
an elevating member provided at an internal side or external side of the magnet member and in contact with the rear surface of the backlight module;
a coil wound on the elevating member; and
an elevating guider inserted into the elevating member and provided to guide an elevating movement of the elevating member,
wherein the damper is provided between the elevating member and the module frame.

6. The display apparatus according to claim 3, wherein the vibration generating device further includes a fixing member for fixing the vibration generating device to a rear surface of the rear structure.

7. The display apparatus according to claim 6, wherein the fixing member is double-sided tape or adhesive.

8. The display apparatus according to claim 6, wherein the fixing member includes:
a fixing frame attached to the rear surface of the rear structure; and a fastening means for fixing the vibration generating device to the fixing frame.

9. The display apparatus according to claim 1, wherein the vibration generating device includes at least one sound generating module for vibrating the display panel through the backlight module, wherein the at least one sound generating module is fixed to the rear structure, and the at least one sound generating module vibrates the backlight module in accordance with a current applied based on Fleming's left hand rule.

10. The display apparatus according to claim 1, further comprising a partition member disposed between the backlight module and the rear structure and provided to spatially divide the rear surface of the backlight module into at least two areas,
wherein the vibration generating device includes at least two sound generating modules for vibrating the display panel through the backlight module, wherein the at least two sound generating modules are disposed in corresponding areas and are fixed to the rear structure, and
each of the at least two sound generating modules may include at least one actuator.

11. The display apparatus according to claim 10, wherein the display panel vibrates in accordance with the driving of the vibration generating device so as to output 2.0 or 2.1 channel type sound to a front direction.

12. The display apparatus according to claim 1, wherein the backlight module includes:
a light guiding member provided with a light-incidence surface and disposed on the rear surface of the display panel;
an optical sheet portion disposed on a front surface of the light guiding member and connected with the rear surface of the display panel; and
a light source module for emitting light to the light-incidence surface of the light guiding member,
wherein the light guiding member is vibrated by the vibration generating device, and the display panel is vibrated by a vibration transferred from the light guiding member.

13. The display apparatus according to claim 12, wherein the backlight module further includes a transparent adhesion member interposed between the optical sheet portion and the light guiding member,
wherein the optical sheet portion includes at least two optical sheets disposed between the display panel and the light guiding member and adhered to each other by the use of sheet adhesion member, and
a lowermost optical sheet of the at least two optical sheets, which directly faces the light guiding member, is adhered to the front surface of the light guiding member by the use of transparent adhesion member.

14. The display apparatus according to claim 13, wherein the transparent adhesion member includes a honeycomb pattern or a plurality of line patterns provided at fixed intervals on the plane.

15. The display apparatus according to claim 13, wherein the transparent adhesion member includes a plurality of line patterns provided at fixed intervals, wherein each line pattern is formed in a zigzag shape.

16. The display apparatus according to claim 12, further comprising a rear light-leaking prevention member for preventing a light leakage in a rear surface of the light guiding member,
wherein the vibration generating device vibrates the light guiding member through a rear surface of the rear light-leaking prevention member.

17. The display apparatus according to claim 16, wherein the rear light-leaking prevention member includes a rear coating layer directly coated onto the rear surface of the light guiding member, or a reflective sheet attached to the rear surface of the light guiding member.

18. The display apparatus according to claim 16, wherein the rear light-leaking prevention member includes a reflective sheet attached to the rear surface of the light guiding member, and the reflective sheet is adhered onto the rear surface of the light guiding member by the use of transparent adhesion member.

19. The display apparatus according to claim 18, wherein the transparent adhesion member includes a honeycomb pattern or a plurality of line patterns provided at fixed intervals on the plane.

20. The display apparatus according to claim 12, further comprising:
a first connection member interposed between a rear edge of the light guiding member and a front edge of the rear structure; and
a second connection member interposed between a rear edge of the display panel and a front edge of the light guiding member,
wherein the optical sheet portion is surrounded by the second connection member.

21. The display apparatus according to claim 20, further comprising a lateral cover member interposed between the rear edge of the display panel and the front edge of the rear structure.

22. The display apparatus according to claim 1, wherein the backlight module includes a surface light source panel connected with the rear surface of the display panel and connected with the vibration generating device, wherein the surface light source panel is vibrated by the vibration generating device, and the display panel is vibrated by a vibration transferred from the surface light source panel.

23. The display apparatus according to claim 22, wherein the surface light source panel includes a self-light emitting device layer having any one among an organic light emitting layer, a quantum dot light emitting layer, and a micro light emitting diode.

24. The display apparatus according to claim 1, wherein the display panel, the backlight module, and the rear structure are bent in a curved-line shape.

* * * * *